United States Patent
Sun et al.

(10) Patent No.: US 10,348,446 B1
(45) Date of Patent: Jul. 9, 2019

(54) SIGNALING PHY PREAMBLE FORMATS

(71) Applicant: MARVELL INTERNATIONAL LTD., Hamilton (BM)

(72) Inventors: Yakun Sun, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/049,282

(22) Filed: Jul. 30, 2018

Related U.S. Application Data

(63) Continuation of application No. 15/180,801, filed on Jun. 13, 2016, now Pat. No. 10,038,518.

(60) Provisional application No. 62/199,446, filed on Jul. 31, 2015, provisional application No. 62/183,846, filed on Jun. 24, 2015, provisional application No. 62/174,145, filed on Jun. 11, 2015.

(51) Int. Cl.
| | |
|---|---|
| *H04L 5/00* | (2006.01) |
| *H04L 1/00* | (2006.01) |
| *H04L 27/26* | (2006.01) |
| *H04W 88/06* | (2009.01) |

(52) U.S. Cl.
CPC ........ *H04L 1/0007* (2013.01); *H04L 27/2602* (2013.01); *H04W 88/06* (2013.01)

(58) Field of Classification Search
CPC ......... H04L 69/22; H04L 69/04; H04L 69/08; H04L 27/2613; H04L 27/2605; H04L 27/2627; H04W 84/12
See application file for complete search history.

(56) References Cited

U.S. PATENT DOCUMENTS

| | | | |
|---|---|---|---|
| 6,553,534 | B2 | 4/2003 | Yonge, III et al. |
| 6,856,590 | B2 | 2/2005 | Okada et al. |
| | | (Continued) | |

FOREIGN PATENT DOCUMENTS

| | | |
|---|---|---|
| WO | WO-2006/025996 A2 | 3/2006 |
| WO | WO-2008/046163 | 4/2008 |
| | (Continued) | |

OTHER PUBLICATIONS

Chen, "Home Network Basis: Transmission Environments and Wired/Wireless Protocols," Prentice Hall, pp. 1-26 (Jul. 2003).

(Continued)

*Primary Examiner* — Jamal Javaid

(57) ABSTRACT

A communication device determines a format for a physical layer (PHY) data unit. The communication device selects i) a length value to be included in a field in a legacy portion of a PHY preamble of the PHY data unit, and ii) a phase of modulation of an orthogonal frequency division modulation (OFDM) symbol in a non-legacy portion of the PHY preamble. The length value and the phase of modulation are selected to correspond to the determined format. A first value of a remainder resulting from dividing the length value by three corresponds to a first subset of formats; a second value of the remainder resulting from dividing the length value by three corresponds to a second subset of one or more formats. When the determined format belongs to the first subset, the phase of modulation of the OFDM symbol in the non-legacy portion of the PHY preamble indicates whether the PHY data unit conforms to a multi-user format.

9 Claims, 12 Drawing Sheets

(56) References Cited

U.S. PATENT DOCUMENTS

| | | |
|---|---|---|
| 7,046,746 B1 | 5/2006 | Keaney et al. |
| 7,478,314 B1 | 1/2009 | Cheong et al. |
| 7,558,537 B2 | 7/2009 | Trachewsky et al. |
| 7,577,210 B2 | 8/2009 | Lee |
| 7,599,332 B2 | 10/2009 | Zelst et al. |
| 7,742,390 B2 | 6/2010 | Mujtaba |
| 7,773,565 B2 | 8/2010 | Hansen et al. |
| 7,889,707 B2 | 2/2011 | Niu et al. |
| 7,904,519 B2 | 3/2011 | Czotscher et al. |
| 7,961,593 B2 | 6/2011 | Porat et al. |
| 7,974,225 B2 | 7/2011 | Kasher |
| 8,144,647 B2 | 3/2012 | Nabar et al. |
| 8,155,138 B2 | 4/2012 | van Nee |
| 8,201,065 B1 | 6/2012 | Cheong et al. |
| 8,289,869 B2 | 10/2012 | Sawai |
| 8,310,981 B2 | 11/2012 | Damnjanovic et al. |
| 8,339,978 B2 | 12/2012 | Sawai et al. |
| 8,369,301 B2 | 2/2013 | Cai |
| 8,494,089 B2 | 7/2013 | Aoki et al. |
| 8,526,351 B2 | 9/2013 | Fischer et al. |
| 8,532,077 B2 | 9/2013 | Stacey et al. |
| 8,599,804 B2 | 12/2013 | Erceg et al. |
| 8,619,907 B2 | 12/2013 | Mujtaba et al. |
| 8,627,171 B2 | 1/2014 | Pi |
| 8,681,757 B2 | 3/2014 | Lee et al. |
| 8,718,021 B2 | 5/2014 | Yu et al. |
| 8,724,720 B2 | 5/2014 | Srinivasa et al. |
| 8,737,189 B2 | 5/2014 | Hansen et al. |
| 8,867,653 B2 | 10/2014 | Zhang et al. |
| 8,873,680 B2 | 10/2014 | Zhang |
| 8,885,740 B2 | 11/2014 | Zhang et al. |
| 8,948,283 B2 | 2/2015 | Zhang |
| 8,953,696 B2 | 2/2015 | Stoye |
| 8,982,889 B2 | 3/2015 | Zhang |
| 9,131,528 B2 | 9/2015 | Zhang et al. |
| 9,209,837 B1 | 12/2015 | Cheong et al. |
| 9,258,178 B2 | 2/2016 | Zhang |
| 9,350,583 B2 | 5/2016 | Zhang |
| 10,038,518 B1 | 7/2018 | Sun et al. |
| 2002/0003773 A1 | 1/2002 | Okada et al. |
| 2002/0188908 A1 | 12/2002 | Yonge et al. |
| 2003/0056043 A1 | 3/2003 | Kostadinov |
| 2004/0179627 A1 | 9/2004 | Ketchum et al. |
| 2006/0034384 A1 | 2/2006 | Lee |
| 2006/0176966 A1 | 8/2006 | Stewart et al. |
| 2006/0182017 A1 | 8/2006 | Hansen et al. |
| 2007/0183523 A1 | 8/2007 | Koo et al. |
| 2008/0299962 A1 | 12/2008 | Kasher |
| 2009/0086699 A1 | 4/2009 | Niu et al. |
| 2009/0122771 A1 | 5/2009 | Cai |
| 2009/0190465 A1 | 7/2009 | Porat et al. |
| 2009/0196163 A1 | 8/2009 | Du |
| 2010/0034323 A1 | 2/2010 | Stoye |
| 2010/0046358 A1 | 2/2010 | van Nee |
| 2010/0046656 A1 | 2/2010 | van Nee et al. |
| 2010/0091673 A1 | 4/2010 | Sawai et al. |
| 2010/0091675 A1 | 4/2010 | Sawai |
| 2010/0103920 A1 | 4/2010 | Damnjanovic et al. |
| 2010/0202301 A1 | 8/2010 | Wen et al. |
| 2010/0260159 A1 | 10/2010 | Zhang et al. |
| 2010/0309834 A1 | 12/2010 | Fischer et al. |
| 2011/0002219 A1 | 1/2011 | Kim et al. |
| 2011/0032875 A1 | 2/2011 | Erceg et al. |
| 2011/0110348 A1 | 5/2011 | Lee et al. |
| 2011/0122846 A1 | 5/2011 | Yu et al. |
| 2011/0271169 A1 | 11/2011 | Pi |
| 2012/0170563 A1 | 7/2012 | Abraham et al. |
| 2012/0195391 A1 | 8/2012 | Zhang et al. |
| 2012/0201316 A1 | 8/2012 | Zhang et al. |
| 2012/0236971 A1 | 9/2012 | Taghavi Nasrabadi et al. |
| 2012/0294268 A1 | 11/2012 | Lee et al. |
| 2012/0294294 A1 | 11/2012 | Zhang |
| 2012/0294392 A1 | 11/2012 | Zhang |
| 2012/0300874 A1 | 11/2012 | Zhang |
| 2012/0327871 A1 | 12/2012 | Ghosh et al. |
| 2013/0202001 A1 | 8/2013 | Zhang |
| 2013/0259017 A1 | 10/2013 | Zhang et al. |
| 2013/0266083 A1 | 10/2013 | Baik et al. |
| 2014/0337690 A1 | 11/2014 | Zhang |
| 2015/0071372 A1 | 3/2015 | Zhang |
| 2015/0117227 A1 | 4/2015 | Zhang et al. |
| 2015/0117433 A1 | 4/2015 | Zhang et al. |
| 2016/0156750 A1 | 6/2016 | Zhang et al. |
| 2017/0288748 A1* | 10/2017 | Lou ............... H04B 7/0452 |

FOREIGN PATENT DOCUMENTS

| | | |
|---|---|---|
| WO | WO-2009052420 A2 | 4/2009 |
| WO | WO-2009/059229 | 5/2009 |
| WO | WO-2009/084926 | 7/2009 |
| WO | WO-2012/106635 | 8/2012 |
| WO | WO-2012/122119 | 9/2012 |
| WO | WO-2013/152111 | 10/2013 |
| WO | WO-2014/183059 | 11/2014 |

OTHER PUBLICATIONS

Chun et al., "Legacy Support on HEW frame structure," doc: IEEE 11-13/1057r0, *The Institute of Electrical and Electronics Engineers, Inc.*, pp. 1-8 (Sep. 2013).

De Vegt, "Potential Compromise for 802.11ah Use Case Document", Institute of Electrical and Electronics Engineers, doc. No. IEEE 802.11-11/0457r0, pp. 1-27 (Mar. 2011).

Francis, Michael, "Viterbi Decoder Block Decoding—Trellis Termination and Tail Biting," Xilinx XAPP551 v2.0, pp. 1-21 (Jul. 30, 2010).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Harada, "Project: IEEE P802.15 Working Group for Wireless Personal Area Network (WPANs)," IEEE 802.15-07-0693-003c (May 2007).

Hiertz et al., "The IEEE 802.11 Universe," IEEE Communications Magazine, pp. 62-70, (Jan. 2010).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ad™/D9.0 "Draft Standard for Information technology- Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements

(56) References Cited

OTHER PUBLICATIONS for Very High Throughput in the 60 GHz Band *The Institute of Electrical and Electronics Engineers, Inc.*, (Jul. 2012).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Lee et al., "TGaf PHY proposal," *The Institute of Electrical and Electronics Engineers*, doc. No. IEEE 802.11-12/0809r5, pp. 1-43, Jul. 10, 2012.
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", The Institute of Electrical and Electronics Engineers, doc. No. IEEE 802.11--yy/xxxxr05, (Jan. 2012), pp. 1-12.
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
Seok et al., "HEW PPDU Format for Supporting MIMO-OFDMA," IEEE 802.11-14/1210r0, 16 pages, (Sep. 14, 2014).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10, 1361 r3 (Jan. 2011 ).
Stacey et al., "Specification Framework for TGac," document No. IEEE 802.11-09/0992r20, *Institute tor Electrical and Electronics Engineers*, pp. 1-49, Jan. 18, 2011.
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 GBPS MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
U.S. Appl. No. 15/143,075, Sun et al., "WiFi Classification by Pilot Sequences," filed Apr. 29, 2016.
U.S. Appl. No. 15/180,801, Sun et al., "Signaling PHY Preamble Formats," filed Jun. 13, 2016.
U.S. Appl. No. 15/265,614, Sun et al., "Physical Layer Frame Format for WLAN," filed Sep. 14, 2016.
Van Nee et al., "The 802.11 n MIMO-OFDM Standard for Wireless LAN and Beyond," Wireless Personal Communications, vol. 37, pp. 445-453 (Jun. 2006).
Van Zelst et al., "Pilot Sequence for VHT-DATA," Doc. No. IEEE 802.11-10, 0811 r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Zhang et al., "11 ah Data Transmission Flow," *The Institute of Electrical and Electronics Engineers*, doc. No. IEEE 802.11-11/1484r1, pp. 1-15 (Nov. 2011).
Zhang et al., "1 MHz Waveform in Wider BW", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang Zhao-Yang: "A Novel AFDM Transmission Scheme with Length-Adaptive Cyclic Prefix," Journal of Zhejiang University. Science, Zhejiant University Press, Hangzhou, CN vol. 5, No. 11, Jul. 7, 2003, pp. 1336-1342.

* cited by examiner

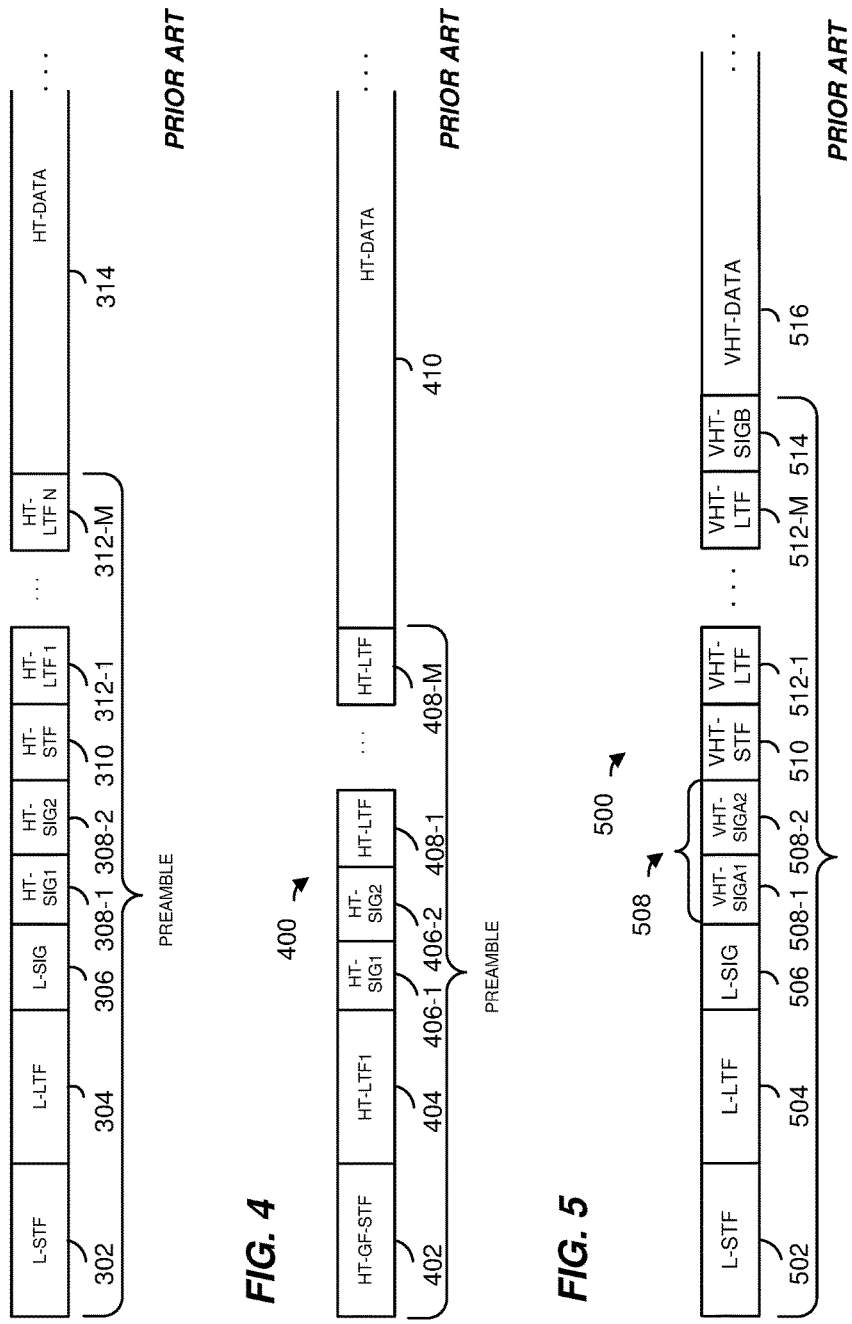

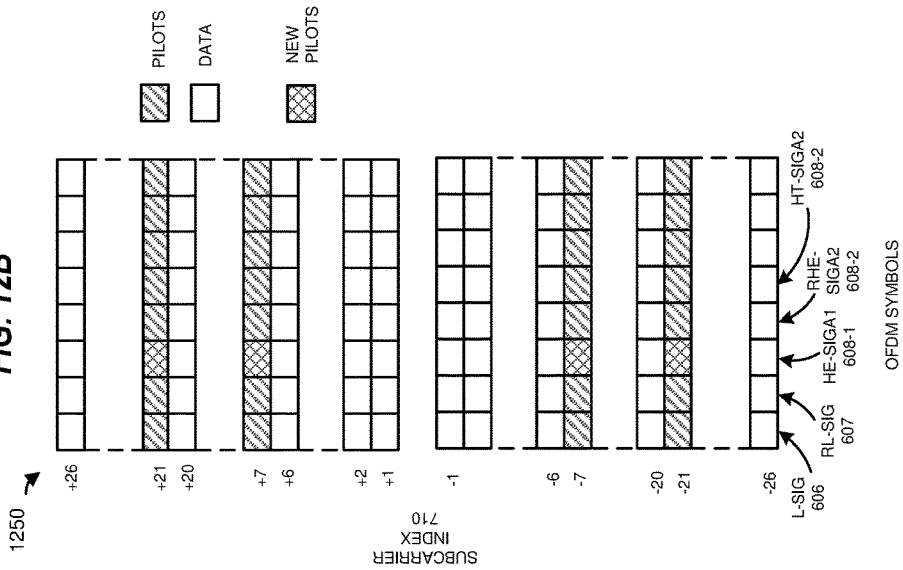
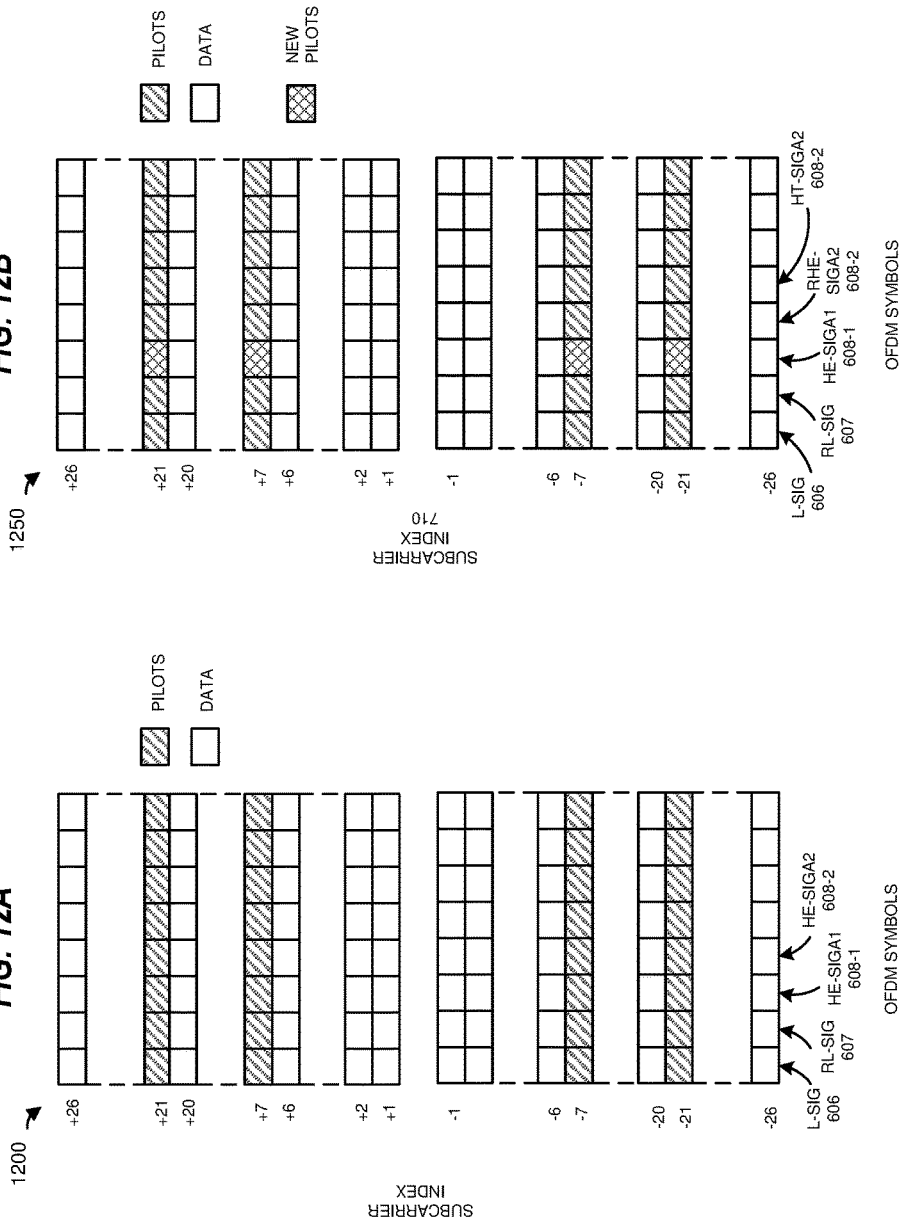
FIG. 12A
FIG. 12B

SIGNALING PHY PREAMBLE FORMATS

CROSS-REFERENCES TO RELATED APPLICATIONS

This application is a continuation of U.S. patent application Ser. No. 15/180,801, now U.S. Pat. No. 10,038,518, entitled "Signaling PHY Preamble Formats," filed on Jun. 13, 2016, which claims the benefit of U.S. Provisional Patent Application No. 62/174,145, entitled "Early Signaling SIG Format," filed on Jun. 11, 2015, U.S. Provisional Patent Application No. 62/183,846, entitled "Early Signaling SIG Format," filed on Jun. 24, 2015, and U.S. Provisional Patent Application No. 62/199,446, entitled "Early Signaling SIG Format," filed on Jul. 31, 2015. All of the applications referenced above are incorporated herein by reference in their entireties.

FIELD OF DISCLOSURE

The present disclosure relates generally to communication networks and, more particularly, to wireless local area networks that utilize multiple data unit formats.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: determining, at a communication device, a format according to which a physical layer (PHY) data unit is to be generated, the determined format from a set of multiple PHY formats defined by a communication protocol; selecting, at the communication device, i) a length value to be included in a field in a legacy portion of a PHY preamble of the PHY data unit, and ii) a phase of modulation of an orthogonal frequency division modulation (OFDM) symbol in a non-legacy portion of the PHY preamble. The length value and the phase of modulation are selected to correspond to the determined format; the length value is not divisible by three; a first value of a remainder resulting from dividing the length value by three corresponds to a first subset of formats among the multiple PHY formats; the first subset of formats includes a multi-user format; a second value of the remainder resulting from dividing the length value by three corresponds to a second subset of one or more formats among the multiple PHY formats. When the determined format belongs to the first subset, the phase of modulation of the OFDM symbol in the non-legacy portion of the PHY preamble indicates whether the PHY data unit conforms to the multi-user format. The method also includes: generating, at the communication device, the PHY data unit to include the selected length value in the field in the legacy portion of the PHY preamble and to modulate the OFDM symbol in the non-legacy portion of the PHY preamble with the selected phase; and transmitting, by the communication device, the PHY data unit.

In another embodiment, an apparatus comprises a network interface device having one or more integrated circuit (IC) devices. The one or more IC devices are configured to: determine a format according to which a physical layer (PHY) data unit is to be generated, the determined format from a set of multiple PHY formats defined by a communication protocol; select i) a length value to be included in a field in a legacy portion of a PHY preamble of the PHY data unit, and ii) a phase of modulation of an orthogonal frequency division modulation (OFDM) symbol in a non-legacy portion of the PHY preamble. The length value and the phase of modulation are selected to correspond to the determined format; the length value is not divisible by three; a first value of a remainder resulting from dividing the length value by three corresponds to a first subset of formats among the multiple PHY formats; the first subset of formats includes a multi-user format; a second value of the remainder resulting from dividing the length value by three corresponds to a second subset of one or more formats among the multiple PHY formats; and the second subset of formats includes a multi-user format. When the determined format belongs to the first subset, the phase of modulation of the OFDM symbol in the non-legacy portion of the PHY preamble indicates whether the PHY data unit conforms to the multi-user format. The one or more IC devices are further configured to: generate the PHY data unit to include the selected length value in the field in the legacy portion of the PHY preamble and to modulate the OFDM symbol in the non-legacy portion of the PHY preamble with the selected phase; and transmit the data unit.

In yet another embodiment, a method includes: receiving, at a communication device, a physical layer (PHY) data unit via a communication channel; analyzing, at the communication device, i) a length value in a field in a legacy portion of a PHY preamble of the PHY data unit, and ii) a phase of modulation of an orthogonal frequency division modulation (OFDM) symbol in a non-legacy portion of the PHY preamble; determining, at the communication device, a format of the received PHY data unit corresponding to the analysis of i) the length value and ii) the phase of modulation of the OFDM symbol in the non-legacy portion of the PHY preamble, the determined format from a set of multiple PHY formats defined by a communication protocol; and processing, at the communication device, the received PHY data unit according to the determined format.

In still another embodiment, an apparatus comprises: a network interface device having one or more integrated circuit (IC) devices. The one or more IC devices are configured to: receive a physical layer (PHY) data unit via a communication channel; analyze i) a length value in a field in a legacy portion of a PHY preamble of the PHY data unit, and ii) a phase of modulation of an orthogonal frequency division modulation (OFDM) symbol in a non-legacy portion of the PHY preamble; determine a format of the received PHY data unit corresponding to the analysis of i) the length value and ii) the phase of modulation of the OFDM symbol in the non-legacy portion of the PHY preamble, the determined format from a set of multiple PHY formats defined by a communication protocol; and process the received PHY data unit according to the determined format.

BRIEF DESCRIPTION OF THE DRAWINGS

FIG. 3 is a diagram of another prior art PHY data unit that one or more communication devices in the network of FIG. 1 are configured to transmit, according to an embodiment.

FIG. 4 is a diagram of another prior art PHY data unit that one or more communication devices in the network of FIG. 1 are configured to transmit, according to an embodiment.

FIG. 5 is a diagram of yet another prior art PHY data unit that one or more communication devices in the network of FIG. 1 are configured to transmit, according to an embodiment.

FIGS. 12A-B are diagrams of example pilot sequences in data units of different formats, according to another embodiment.

DETAILED DESCRIPTION

In embodiments described below, a wireless network device such as an access point (AP) or client station (STA) of a wireless local area network (WLAN) generates a physical layer (PHY) data unit for transmission over a communication channel. The PHY data unit includes a PHY preamble, according to some embodiments. In some embodiments, the PHY preamble is configured to indicate a format of the PHY data unit so that a receiver of the data unit can determine the format of the PHY data unit by analyzing the PHY preamble.

Figure 1:
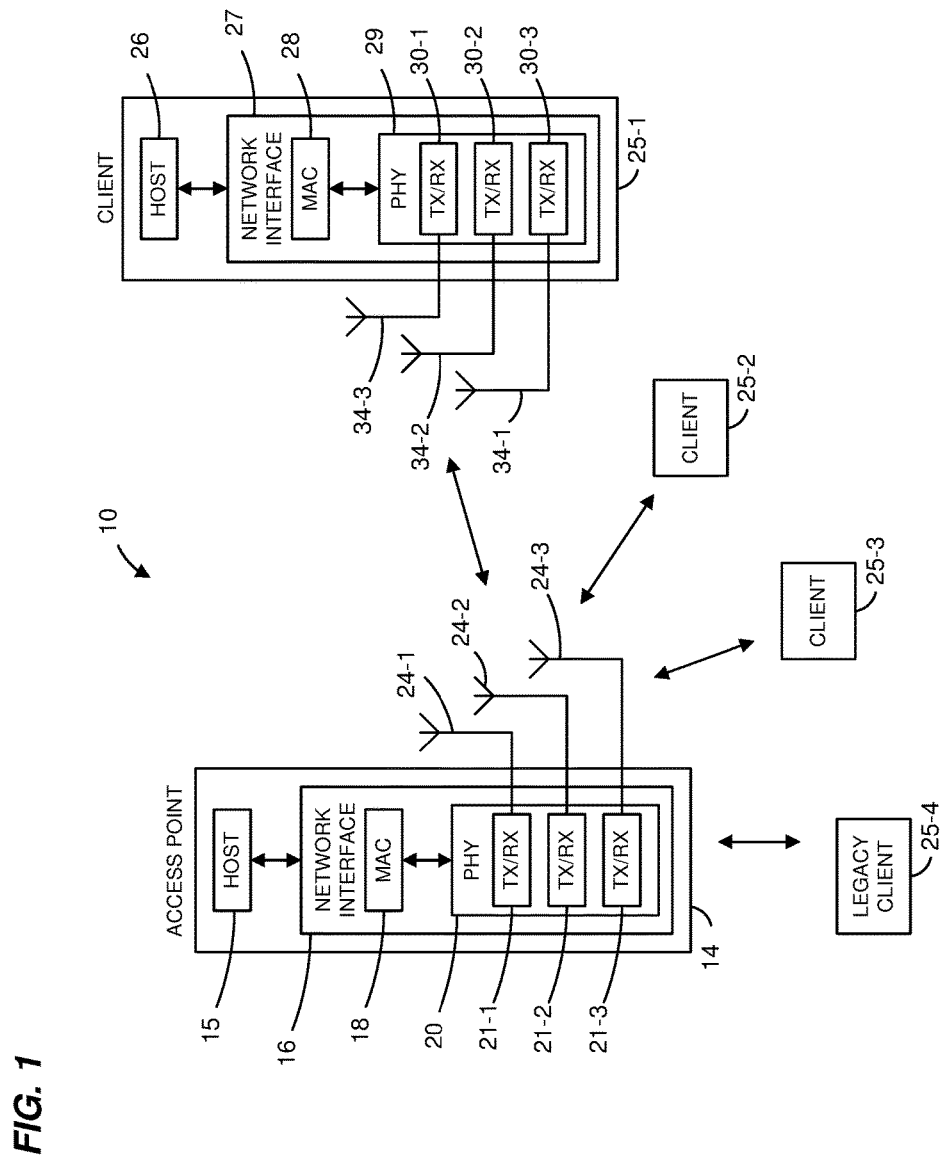
FIG. 1 is a block diagram of an example wireless communication network in which communication devices utilize a physical layer (PHY) preamble to determine formats of data units, according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a PHY processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol. In some embodiments, the first communication protocol defines a plurality of different data unit formats (e.g., PHY data unit formats). The first communication protocol is a wireless communication protocol, in some embodiments. The first communication protocol is a wireless local area network (WLAN) communication protocol, in some embodiments. The first communication protocol is sometimes referred to herein as a "high efficiency protocol", an "HE protocol", a "high efficiency WLAN protocol", and/or a "HEW protocol".

In some embodiments, the MAC processor 18 and the PHY processor 20 are additionally configured to operate according to a second legacy communication protocol (e.g., according to the IEEE 802.11ac Standard, the IEEE 802.11n Standard, the IEEE 802.11g Standard, and/or the IEEE 802.11a Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 (e.g., client station 25-1) is configured to operate at least according to the first communication protocol and according to the second communication protocol. In some embodiments, at least one of the client stations 25 is not configured to operate according to the first communication protocol but is configured to operate according to at least one of the third communication protocol and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. In some embodiments, the legacy client station 25-4 also is not enabled to receive and fully decode, as well as transmit, data units according to the second communication protocol. In some embodiments, the legacy client station 25-4 is enabled to receive and fully decode, as well as transmit, data units according to the second communication protocol. In some embodiments, the legacy client station 25-4 is enabled to receive and fully decode and transmit data units according to the third communication protocol and/or the fourth communication protocol, in some embodiments.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and/or the PHY processor 20 of the AP 14 are configured to generate data units conforming to the first communication protocol and/or data units conforming to the second communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MAC protocol data units (MPDUs), MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. In some embodiments, the MAC processor 18 and/or the PHY processor 20 of the AP 14 are configured to process received data units conforming to the first communication protocol and having different data unit formats defined by the first communication protocol, and to determine that such data units conform to the various data unit formats of the first communication protocol, according to various embodiments. In some embodiments, the MAC processor 18 and the PHY processor 20 of the AP 14 are configured to process received data units conforming to the first communication protocol and data units conforming to the second communication protocol, and to determine that such data units conform to the first communication protocol or to the second communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. In some embodiments, the MAC processor 28 and/or the PHY processor 29 are configured to process received data units conforming to the first communication protocol and having different data unit formats defined by the first communication protocol, and to determine that such data units conform to the various data unit formats of the first communication protocol, according to various embodiments. In some embodiments, he the MAC processor 28 and/or PHY processing unit 29 of the client device 25-1 are configured to process received data units conforming to the first communication protocol and data units conforming to the second communication protocol, and to determine that such data units conform to the first communication protocol or the second communication protocol, according to various embodiments.

Figure 2A:
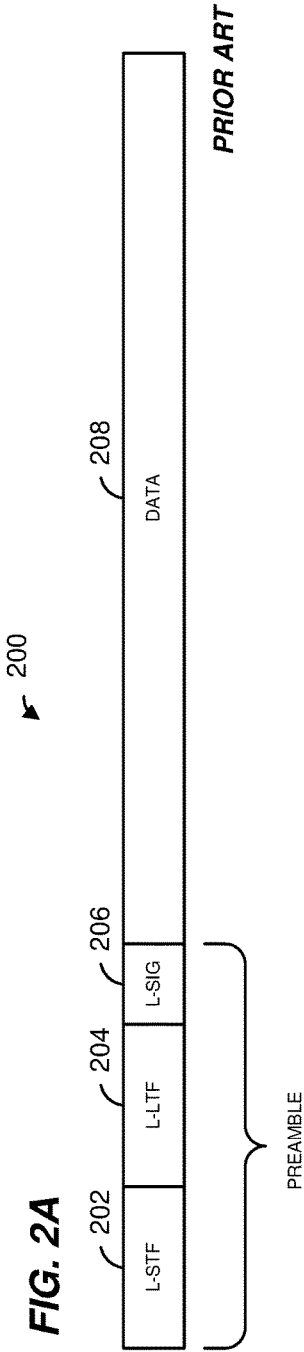
FIG. 2A is a diagram of a prior art PHY protocol data unit that one or more communication devices in the network of FIG. 1 are configured to transmit.
Figure 2B:
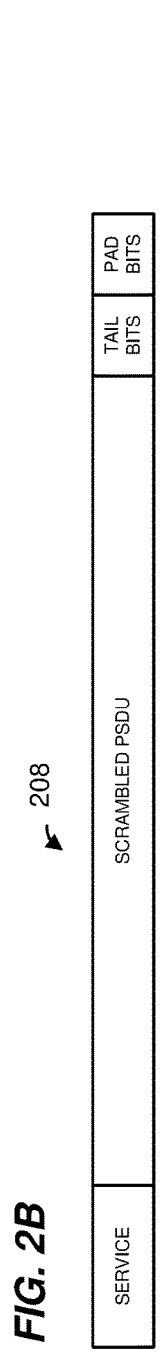
FIG. 2B is a diagram of a media access control (MAC) protocol data unit that is included in the data field of the PHY data unit of FIG. 2A.

FIG. 2A is a diagram of a prior art data unit 200 that the AP 14 is configured to transmit to the client station 25-4 via orthogonal frequency division multiplexing (OFDM) modulation, according to an embodiment. In an embodiment, the client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

FIG. 3 is a diagram of a prior art data unit 300 that the AP 14 is configured to transmit to the client station 25-4 via OFDM modulation, according to an embodiment. In an embodiment, the client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

FIG. 4 is a diagram of a prior art data unit 400 that the AP 14 is configured to transmit to the client station 25-4 via OFDM modulation, according to an embodiment. In an embodiment, the client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

FIG. 5 is a diagram of a prior art data unit 500 that the client station AP 14 is configured to transmit to the client station 25-4 via OFDM modulation, according to an embodiment. In an embodiment, the client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, where M is an integer, and a second very high throughput signal field (VHT-SIG-B) 514. The data unit 500 also includes a data portion 516.

Figure 6:
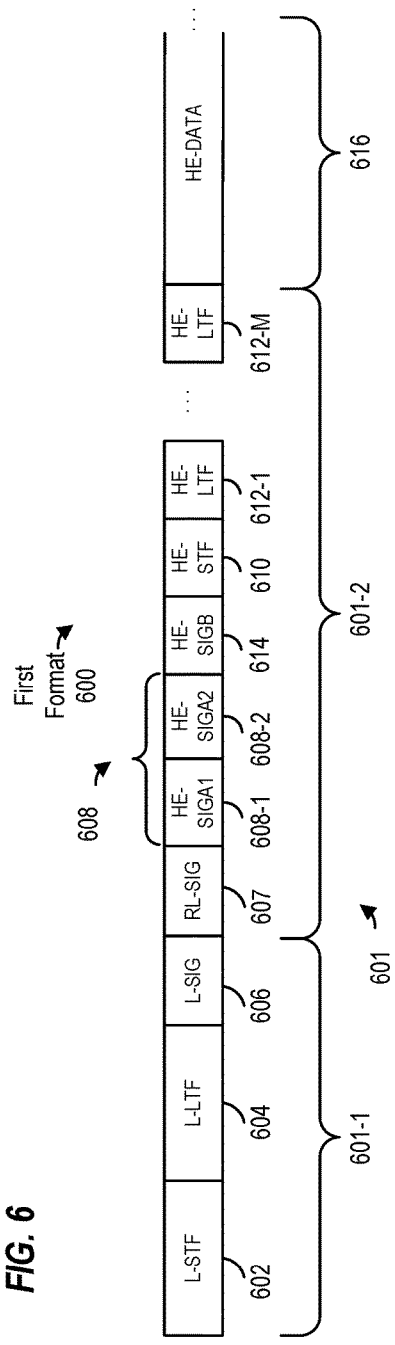
FIG. 6 is a diagram of an example format of a PHY data unit that one or more communication devices in the network of FIG. 1 are configured to transmit, according to an embodiment.

FIG. 6 is a diagram of a PHY data unit 600 that the client station AP 14 is configured to transmit to the client station 25-1 via OFDM modulation, according to an embodiment. In an embodiment, the client station 25-1 is also configured to transmit the data unit 600 to the AP 14. In an embodiment, the PHY data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments and/or scenarios. The PHY data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the PHY data unit 600 conforms to a first PHY data unit format specified by the first communication protocol.

In an embodiment, the PHY data unit 600 includes a preamble 601 having an L-STF 602, an L-LTF 604, an L-SIG 606, a repeated L-SIG (RL-SIG) 607, two first HE signal fields (HE-SIGAs) 608 including a first HE signal field (HE-SIGA1) 608-1 and a second HE signal field (HE-SIGA2) 608-2, a HE short training field (HE-STF) 610, an integer number M HE long training fields (HE-LTFs) 612, and a third HE signal field (HE-SIGB) 614. In an embodiment, the preamble 601 comprises a legacy portion 601-1 and a non-legacy portion 601-2. The legacy portion 601-1 includes the L-STF 602, the L-LTF 604, and the L-SIG 606, and the non-legacy portion 601-2 includes the RL-SIG 607, the HE-SIGAs 608, HE-STF 610, M HE-LTFs 612, and HE-SIGB 614, according to an embodiment.

Each of the L-STF 602, the L-LTF 604, the L-SIG 606, the HE-SIGAs 608, the HE-STF 610, the M HE-LTFs 612, and the HE-SIGB 614 are included in an integer number of one or more OFDM symbols. For example, in an embodiment, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data frame).

In the embodiment of FIG. 6, the data unit 600 includes one of each of the L-STF 602, the L-LTF 604, the L-SIG 606, and the HE-SIGAs 608. In other embodiments in which an OFDM data unit similar to the data unit 600 occupies a cumulative bandwidth other than 20 MHz, each of the L-STF 602, the L-LTF 604, the L-SIG 606, the HE-SIGAs 608 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 602, the L-LTF 604, the L-SIG 606, and the HE-SIGAs 608 in four 20 MHz-wide sub-bands that cumulatively span the 80 MHz bandwidth, in an embodiment.

The co-existence, in a communication network, of multiple devices conforming to different communication protocols using different data unit formats, requires an ability within a receiver device to determine, in a received data unit, the communication protocol used for the received data unit. In addition, a single communication protocol can define multiple data unit formats corresponding to, for example, different operation modes, different transmission ranges, different throughputs, different power consumption levels, etc. Hence, it is often useful for a receiver to make a determination regarding the format of a received data unit so that the receiver can process the data unit according to the correct data unit format.

In some embodiments/scenarios, it is advantageous to distinguish amongst the multiple data unit formats early within a received data unit, such as during reception and/or processing of a PHY preamble. Early detection of the data unit format is useful, for example, when different data unit formats have different corresponding PHY preamble formats, at least in some embodiments.

In an embodiment, the first communication protocol also defines a second PHY data unit format similar to the format depicted in FIG. 6, except that the PHY preamble 601 omits the HE-SIGA2 608-2. Thus, in an embodiment, the first communication protocol defines the second PHY data unit format such that the HE-SIGA field 608 does not include any other OFDM symbol other than the HE-SIGA1 608-1.

Figure 7:
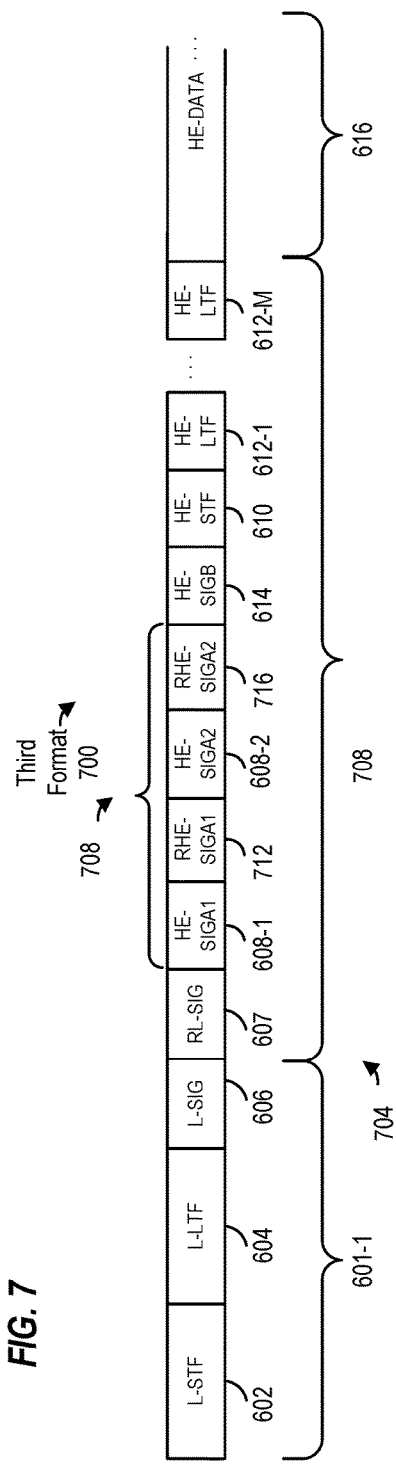
FIG. 7 is a diagram of another example format of a PHY data unit that one or more communication devices in the network of FIG. 1 are configured to transmit, according to an embodiment.

FIG. 7 is a diagram of a PHY data unit 700 that the client station AP 14 is configured to transmit to the client station 25-1 via OFDM modulation, according to an embodiment. In an embodiment, the client station 25-1 is also configured to transmit the data unit 700 to the AP 14. In an embodiment, the PHY data unit 700 conforms to the first communication protocol and occupies a 20 MHz bandwidth. Data units that conform to the first communication protocol similar to the data unit 700 may occupy other suitable bandwidths such as 40 MHz, 80 MHz, 160 MHz, 320 MHz, 640 MHz, etc., for example, or other suitable bandwidths, in other embodiments and/or scenarios. The PHY data unit 700 is suitable for "mixed mode" situations, i.e., when the WLAN 10 includes a client station (e.g., the legacy client station 25-4) that conforms to a legacy communication protocol, but not the first communication protocol. The data unit 700 is utilized in other situations as well, in some embodiments.

In an embodiment, the PHY data unit 700 conforms to a third PHY data unit format specified by the first communication protocol.

The PHY data unit 700 is similar to the PHY data unit 600 and like-numbered elements are not discussed in detail for purposes of brevity. Unlike the first PHY data unit format of FIG. 6, a PHY preamble 704 of the PHY data unit 700 includes an HE-SIGA field 708 that utilizes a repetition mode. For example, in an embodiment, the HE-SIGA field 708 includes the HE-SIGA1 608-1 and a repeated version of HE-SIGA1 608-1, i.e., RHE-SIGA1 712. Similarly, in an embodiment, the HE-SIGA field 708 includes the HE-SIGA2 608-2 and a repeated version of HE-SIGA2 608-2, i.e., RHE-SIGA1 716.

In an embodiment, the first communication protocol also defines a fourth PHY data unit format similar to the format depicted in FIG. 7, except that the HE-SIGA 708 omits the HE-SIGA2 608-2 and RHE-SIGA2 716. Thus, in an embodiment, the first communication protocol defines the fourth PHY data unit format such that the HE-SIGA field 708 does not include any other OFDM symbol other than the HE-SIGA1 608-1 and RHE-SIGA1 712.

Figure 8:
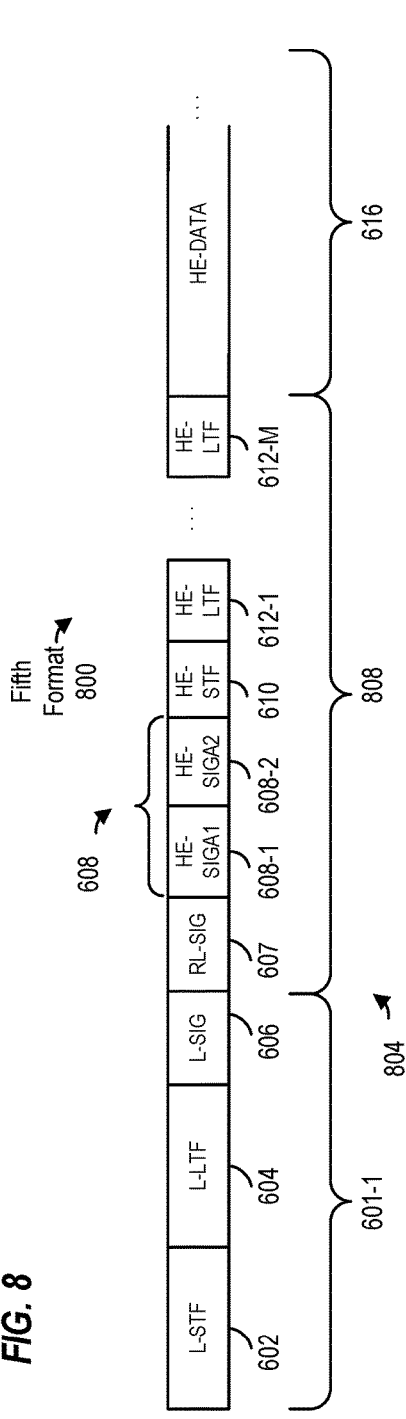
FIG. 8 is a diagram of yet another example format of a PHY data unit that one or more communication devices in the network of FIG. 1 are configured to transmit, according to an embodiment.

FIG. 8 is a diagram of a PHY data unit 800 that the client station AP 14 is configured to transmit to the client station 25-1 via OFDM modulation, according to an embodiment. In an embodiment, the client station 25-1 is also configured to transmit the data unit 800 to the AP 14. In an embodiment, the PHY data unit 800 conforms to the first communication protocol and occupies a 20 MHz bandwidth. Data units that conform to the first communication protocol similar to the data unit 800 may occupy other suitable bandwidths such as 40 MHz, 80 MHz, 160 MHz, 320 MHz, 640 MHz, etc., for example, or other suitable bandwidths, in other embodiments and/or scenarios. The PHY data unit 800 is suitable for "mixed mode" situations, i.e., when the WLAN 10 includes a client station (e.g., the legacy client station 25-4) that conforms to a legacy communication protocol, but not the first communication protocol. The data unit 800 is utilized in other situations as well, in some embodiments.

In an embodiment, the PHY data unit 800 conforms to a fifth PHY data unit format specified by the first communication protocol.

The PHY data unit 800 is similar to the PHY data unit 600 and like-numbered elements are not discussed in detail for purposes of brevity. Unlike the first PHY data unit format of FIG. 6, a PHY preamble 804 of the PHY data unit 800 includes omits the HE-SIGB field 614. Thus, in an embodiment, the first communication protocol defines the fifth PHY data unit format such that the PHY preamble 704 does not include any signal field between HE-SIGA 608 and the HE-STF field 610.

In an embodiment, the first communication protocol also defines a sixth PHY data unit format similar to the format depicted in FIG. 8, except that the PHY preamble 804 omits the HE-SIGA2 608-2. Thus, in an embodiment, the first communication protocol defines the sixth PHY data unit format such that the HE-SIGA field 608 does not include any other OFDM symbol other than the HE-SIGA1 608-1.

Figure 9:
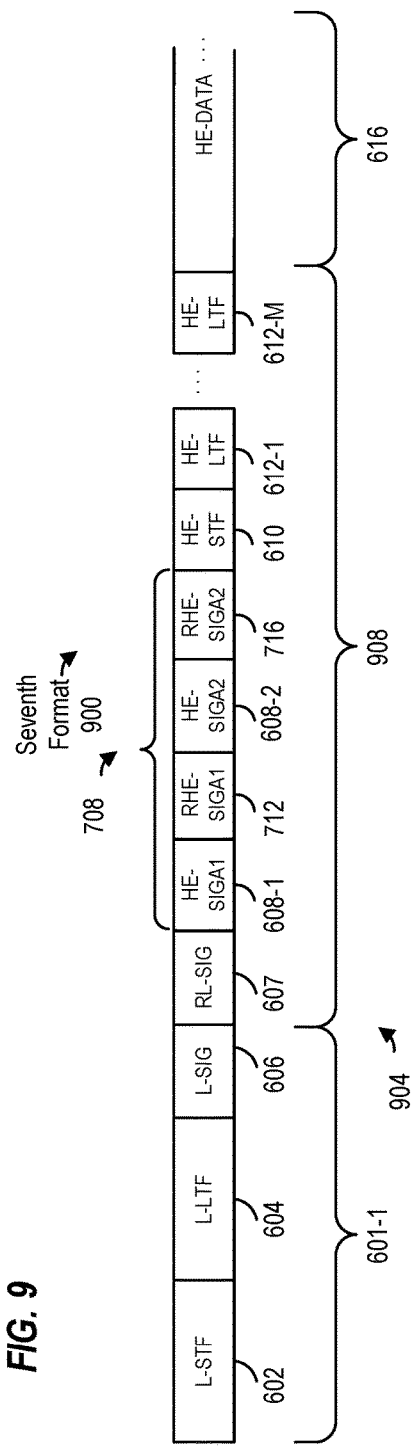
FIG. 9 is a diagram of still another example format of a PHY data unit that one or more communication devices in the network of FIG. 1 are configured to transmit, according to an embodiment.

FIG. 9 is a diagram of a PHY data unit 900 that the client station AP 14 is configured to transmit to the client station 25-1 via OFDM modulation, according to an embodiment. In an embodiment, the client station 25-1 is also configured to transmit the data unit 900 to the AP 14. In an embodiment, the PHY data unit 800 conforms to the first communication protocol and occupies a 20 MHz bandwidth. Data units that conform to the first communication protocol similar to the data unit 900 may occupy other suitable bandwidths such as 40 MHz, 80 MHz, 160 MHz, 320 MHz, 640 MHz, etc., for example, or other suitable bandwidths, in other embodiments and/or scenarios. The PHY data unit 900 is suitable for "mixed mode" situations, i.e., when the WLAN 10 includes a client station (e.g., the legacy client station 25-4) that conforms to a legacy communication protocol, but not the first communication protocol. The data unit 900 is utilized in other situations as well, in some embodiments.

In an embodiment, the PHY data unit 900 conforms to a seventh PHY data unit format specified by the first communication protocol.

The PHY data unit 900 is similar to the PHY data unit 700 and like-numbered elements are not discussed in detail for purposes of brevity. Unlike the third PHY data unit format of FIG. 7, a PHY preamble 904 of the PHY data unit 900 includes omits the HE-SIGB field 614. Thus, in an embodiment, the first communication protocol defines the seventh PHY data unit format such that the PHY preamble 904 does not include any signal field between HE-SIGA 708 and the HE-STF field 610.

In an embodiment, the first communication protocol also defines an eighth PHY data unit format similar to the format depicted in FIG. 9, except that the HE-SIGA 708 omits the HE-SIGA2 608-2 and RHE-SIGA2 716. Thus, in an embodiment, the first communication protocol defines the eighth PHY data unit format such that the HE-SIGA field 708 does not include any other OFDM symbol other than the HE-SIGA1 608-1 and RHE-SIGA1 712.

Referring now to FIGS. 7 and 9, in some embodiments, the repeated HE-SIGA OFDM symbols (e.g., RHE-SIGA1 712 and RHE-SIGA2 716) are transmitted with diversity. For example, in an embodiment, respective modulation applied to RHE-SIGA1 712 and RHE-SIGA2 716 is rotated as compared to respective modulation applied to HE-SIGA1 608-1 and HE-SIGA 608-2. As another example, in an embodiment, information bits corresponding to HE-SIGA1 608-1 and HE-SIGA 608-2 are interleaved prior to modulation according to an interleaving operation, whereas information bits corresponding to RHE-SIGA1 712 and RHE-SIGA2 716 bypass the interleaving operation. Similarly, when HE-SIGA2 608-2 is omitted, a modulation applied to RHE-SIGA1 712 is rotated as compared to a modulation applied to HE-SIGA1 608-1, in an embodiment. As another example, when HE-SIGA2 608-2 is omitted, information bits corresponding to HE-SIGA1 608-1 are interleaved prior to modulation according to an interleaving operation, whereas information bits corresponding to RHE-SIGA1 712 bypass the interleaving operation, according to an embodiment.

In some embodiments, instead of repeating HE-SIGA OFDM symbols, information bits within HE-SIGA 608 are repeated in a bit-wise fashion, or blocks of bits within HE-SIGA 608 are repeated.

In some embodiments, a set of formats allowed by the first communication protocol does not include all of the formats discussed above with respect to FIGS. 6-9. Additionally and/or alternatively, the set of formats allowed by the first communication protocol includes one or more other formats different than the formats discussed above with respect to FIGS. 6-9. For example, in one illustrative embodiment, the set of formats allowed by the first communication protocol includes the first format, the fifth format, and the seventh format, but does not include any of the second format, the third format, the fourth format, the sixth format, or the eighth format. As another example, in another illustrative embodiment, the set of formats allowed by the first communication protocol includes the first format, the fifth format, the seventh format, and one or more other formats not discussed above, but does not include any of the second format, the third format, the fourth format, the sixth format, or the eighth format.

According to some embodiments, the first communication protocol supports single user (SU) communications and multi user (MU) communications. According to some embodiments, at least some MU communications utilize the HE-SIGB 614, whereas SU communications do not use the HE-SIGB 614. Thus, in some embodiments, the HE-SIGB 614 is included in one or more PHY data unit formats corresponding to MU communications, and the HE-SIGB 614 is omitted from PHY data unit formats corresponding to SU communications. In some embodiments, the HE-SIGB 614 is not utilized in uplink MU transmissions, and thus one or more PHY data unit formats corresponding to uplink MU transmissions omit the HE-SIGB 614. In other embodiments, the HE-SIGB 614 is utilized in uplink MU transmissions, and one or more PHY data unit formats corresponding to uplink MU transmissions include the HE-SIGB 614.

According to some embodiments, the first communication protocol supports an extended range mode that is useful for longer range communications (as opposed to normal range or regular mode communications). According to some embodiments, at least some extended range mode communications utilize information repetition regarding HE-SIGA 608, whereas regular mode communications do not use repetition regarding HE-SIGA 608. In some embodiments, the extended range mode is not permitted for MU transmissions. In other embodiments, however, the extended range mode is permitted for MU transmissions.

Various techniques for distinguishing between formats in a set of PHY data unit formats allowed by the first communication protocol are discussed below, according to various embodiments. In some embodiments, techniques described below allow distinguishing between some, but not all, formats in the set of formats. In such embodiments, other suitable techniques for distinguishing between PHY data unit formats are utilized. In some embodiments, techniques described below are used to determine whether a data unit is a SU transmission or an MU transmission, and whether the data unit is transmitted according to the extended range mode.

Distinguishing Among Formats Using Length Information in L-SIG

In some embodiments, the L-SIG 606 includes a length field, and a value of the length field is utilized to distinguish between formats in a set of PHY data unit formats allowed by the first communication protocol. For example, in an embodiment, the first communication protocol specifies that a value of the length field in L-SIG 606 cannot be divisible by a suitable integer (e.g., three), and a remainder resulting from dividing the value of the length field by the suitable integer (e.g., three) is utilized to distinguish between formats in the set of PHY data unit formats allowed by the first communication protocol.

In some embodiments, the remainder resulting from dividing the value of the length field by the suitable integer (e.g., three) is utilized to specify whether the format of a PHY data unit is i) in a first subset of formats in the set of PHY data unit formats allowed by the first communication protocol, or ii) in a second subset of one or more formats in the set of PHY data unit formats allowed by the first communication protocol. In one illustrative embodiment in which the set of formats defined by the first communication protocol includes the first format, the fifth format, and the seventh format, but does not include any of the second format, the third format, the fourth format, the sixth format, or the eighth format, the first subset includes the first format (FIG. 6) and the seventh format (FIG. 9), whereas the second subset includes the fifth format (FIG. 8).

In some embodiments, the first subset includes data formats that include HE-SIGB 614 (e.g., one or more of the first format, the second format, the third format, and the fourth format), whereas the second subset includes data formats that omit HE-SIGB 614 (e.g., one or more of the fifth format, the sixth format, the seventh format, and the eighth format). Thus, in some embodiments, information in the length field of L-SIG 606 is used to indicate whether a data unit i) includes HE-SIGB 614, or ii) omits HE-SIGB 614.

In some embodiments, the first subset includes data formats that utilize repetition regarding HE-SIGA 608 (e.g., one or more of the third format, the fourth format, the seventh format, and the eighth format), whereas the second subset includes data formats that do not utilize repetition regarding HE-SIGA 608 (e.g., one or more of the first format, the second format, the fifth format, and the sixth format). Thus, in some embodiments, information in the length field of L-SIG 606 is used to indicate whether a data unit i) utilizes repetition regarding HE-SIGA 608, or ii) does not utilize repetition regarding HE-SIGA 608.

Distinguishing Among Formats Using Modulation of HE-SIGA

Figure 10A:
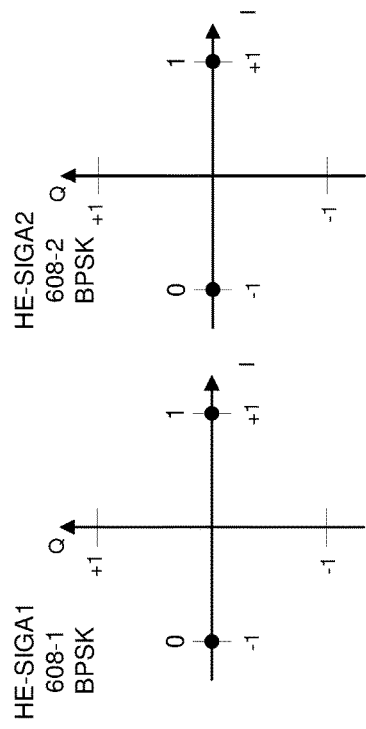
FIGS. 10A-B are diagrams of example modulations applied to OFDM symbols in data units of different formats, according to an embodiment.
Figure 10B:
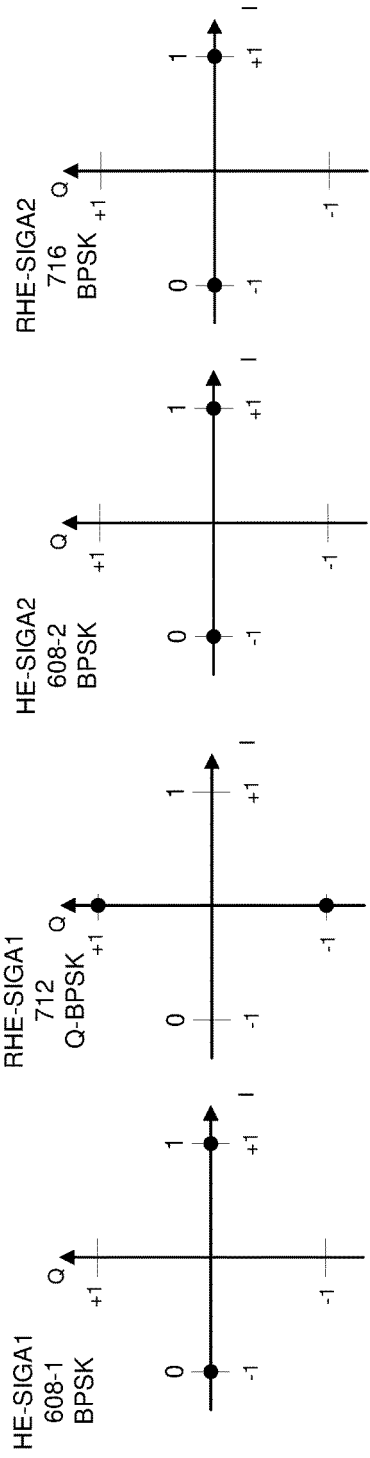

In some embodiments, modulation of one or more OFDM symbols in HE-SIGA 608 is also used (e.g., in combination with using length information in L-SIG 606) to distinguish among PHY data unit formats defined by the first communication protocol. For instance, FIG. 10A is a diagram showing a modulation technique (e.g., binary phase shift keying (BPSK)) applied to HE-SIGA1 608-1 and HE-SIGA2 608-2 with formats that include two or more OFDM symbols in HE-SIG 608 and that do not utilize repetition regarding HE-SIG 608 (e.g., the first format (FIG. 6) and the fifth format (FIG. 8)), according to an embodiment. On the other hand, FIG. 10B is a diagram showing modulation applied to HE-SIGA when repetition regarding HE-SIGA 608 is utilized (e.g., the third format (FIG. 7) and the seventh format (FIG. 9)), according to an embodiment. In the example of FIG. 10B, HE-SIGA1 608-1 is modulated using BPSK, whereas a modulation that is phase rotated with respect to the modulation of HE-SIGA1 608-1 (e.g., quaternary BPSK (Q-BPSK), e.g., phase rotation by 90 degrees with respect to BPSK) is applied to RHE-SIGA1 712, according to an embodiment. The modulation illustrated in FIG. 10B is applied with formats that include one or more OFDM symbols in HE-SIG 608 and that utilize repetition regarding HE-SIG 608 (e.g., the first format (FIG. 6) and the fifth format (FIG. 8)), in an embodiment. Thus, a receiver can analyze the modulation of the second OFDM symbol in the HE-SIGA field to determine whether the modulation of the second OFDM symbol is phase rotated with respect to the modulation of the first OFDM symbol in HE-SIGA field, and can use the determination to help determine a format of the PHY data unit, according to an embodiment. For example, if information in the length field of L-SIG 606 is used to indicate whether the format of a PHY data unit is i) in the first subset of formats in the set of PHY data unit formats allowed by the first communication protocol, or ii) in the second subset of one or more formats in the set of PHY data unit formats allowed by the first communication protocol, modulation of the second OFDM symbol in HE-SIGA can be utilized to select one format from either i) the first subset, or ii) the second subset, according to an embodiment. In embodiments in which the second subset of formats includes only one format, modulation of the second OFDM symbol in HE-SIGA is not utilized when the information in the length field of L-SIG 606 indicates the format of a PHY data unit is in the second subset.

Figure 11A:
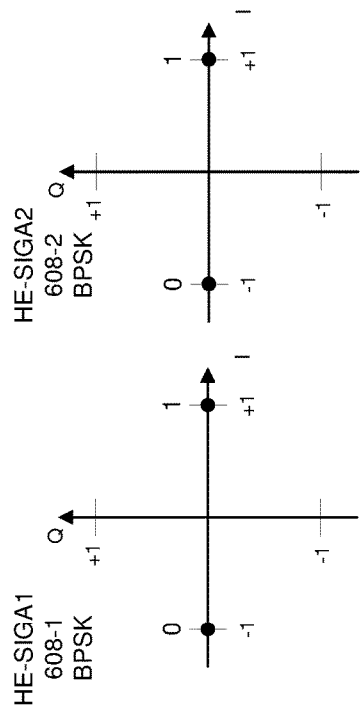
FIGS. 11A-B are diagrams of example modulations applied to OFDM symbols in data units of different formats, according to another embodiment.
Figure 11B:
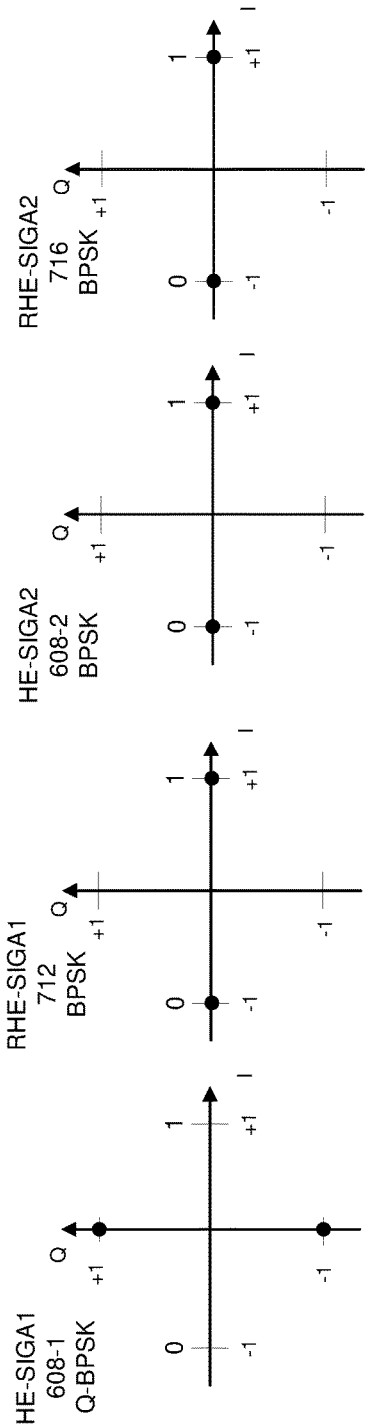

FIG. 11A is a diagram showing a modulation technique (e.g., binary phase shift keying (BPSK)) applied to HE-SIGA1 608-1 and HE-SIGA2 608-2 with formats that include two or more OFDM symbols in HE-SIG 608 and that do not utilize repetition regarding HE-SIG 608 (e.g., the first format (FIG. 6) and the fifth format (FIG. 8)), according to an embodiment. On the other hand, FIG. 11B is a diagram showing modulation applied to HE-SIGA when repetition regarding HE-SIGA 608 is utilized (e.g., the third format (FIG. 7) and the seventh format (FIG. 9)), according to an embodiment. In the example of FIG. 11B, HE-SIGA1 608-1 is modulated with a phase rotation with respect to the modulation of RHE-SIGA1 712 (e.g., quaternary BPSK (Q-BPSK), e.g., phase rotation by 90 degrees with respect to BPSK), whereas RHE-SIGA1 712 is modulated using BPSK, according to an embodiment. The modulation illustrated in FIG. 11B is applied with formats that include one or more OFDM symbols in HE-SIG 608 and that utilize repetition regarding HE-SIG 608 (e.g., the first format (FIG. 6) and the fifth format (FIG. 8)), in an embodiment. Thus, a receiver can analyze the modulation of the first OFDM symbol in the HE-SIGA field to determine whether the modulation of the first OFDM symbol is phase rotated with respect to the modulation of the second OFDM symbol in HE-SIGA field, and can use the determination to help determine a format of the PHY data unit, according to an embodiment. In some embodiments, a receiver can analyze the modulation of the first OFDM symbol in the HE-SIGA field to determine whether the modulation of the first OFDM symbol is phase rotated with respect to the modulation of the second OFDM symbol in HE-SIGA field, and can use the determination to help determine a format of the PHY data unit.

For example, if information in the length field of L-SIG 606 is used to indicate whether the format of a PHY data unit is i) in the first subset of formats in the set of PHY data unit formats allowed by the first communication protocol, or ii) in the second subset of one or more formats in the set of PHY data unit formats allowed by the first communication protocol, modulation of the first OFDM symbol in HE-SIGA can be utilized to select one format from either i) the first subset, or ii) the second subset, according to an embodiment. In embodiments in which the second subset of formats includes only one format, modulation of the first OFDM symbol in HE-SIGA is not utilized when the information in the length field of L-SIG 606 indicates the format of a PHY data unit is in the second subset.

In some embodiments, a receiver determines whether a phase of the modulation of HE-SIGA1 608-1 is rotated with respect to a modulation of an earlier OFDM symbol, such as an OFDM symbol corresponding to L-SIG 606 and/or an OFDM symbol corresponding to RL-SIG 607.

Distinguishing Among Formats Using Pilots

FIG. 12A is a diagram of a portion of a PHY data unit 1200 that the AP 14 is configured to transmit to one or more of the client stations 25 via OFDM modulation, according to an embodiment. In an embodiment, one or more of the client stations 25 are also configured to transmit the OFDM data unit 1200 to the AP 14. In an embodiment, the data unit 1200 conforms to the first communication protocol. In the embodiment of FIG. 12A, the data unit 1200 occupies a 20 MHz bandwidth. The data unit 1200 includes 52 total subcarriers, comprising 48 data subcarriers and 4 pilot subcarriers, and the pilot subcarriers are located on subcarrier indices ±7, ±21, according to an embodiment. In an embodiment, the subcarriers are spaced 312.5 kHz apart. The pilot subcarriers modulate pilot sequences that are defined by the first communication protocol.

In some embodiments, an n-th OFDM symbol of the OFDM data unit 1200, e.g., starting from L-SIG 606, is given by:

$$r_n(t) = \frac{1}{\sqrt{N_{field}^{tone}}} \sum_{k=-N_{SD}}^{N_{SD}} (x_{n,k} + p_n P_k) \exp(j2\pi k \Delta_F (t - T_{GI}))  \quad \text{Equation 1}$$

where, $x_{n,k}$ is a value of a mapped constellation point of the data unit for the n-th OFDM symbol at a k-th subcarrier tone, k is a subcarrier index, $\pm N_{SD}$ are the minimum and maximum subcarrier indices, $\Delta_F$ is a subcarrier bandwidth, $p_n$ is an n-th value of a bit sequence defined by the first communication protocol, $P_k$ is another sequence defined by the first communication protocol, and $T_{GI}$ is a guard interval duration. Parameter $p_n P_k$ sets a pilot value at the n-th OFDM symbol and k-th subcarrier tone. In some embodiments, $P_k=\{1,1,1,-1\}$ are pilot values at k=−21,−7, 7, and 21, and zero at other values of k. In some embodiments, $p_n$ is a cyclic extension of a 127-bit sequence.

In some embodiments, data unit formats are signaled based on pilot sequences in OFDM symbols of a data unit. In various embodiments, one or more pilot sequences are selected from a plurality of pilot sequences based on a format of the data unit to be transmitted, wherein different pilot sequences in the plurality of pilot sequences correspond to different data unit formats (e.g., PHY data unit formats). In some embodiments, the one or more selected pilot sequences span multiple OFDM symbols of the data unit. In other embodiments, the one or more selected pilot sequences span a single OFDM symbol of the data unit. In some embodiments, a format of a received data unit is determined on the basis of an identified pilot sequence in the received data unit.

For example, in some embodiments, the diagram of FIG. 12A corresponds to formats that do not utilize repetition regarding HE-SIG 608 (e.g., the first format (FIG. 6) and the fifth format (FIG. 8)), according to an embodiment. On the other hand, FIG. 12B is a diagram corresponding to formats in which repetition regarding HE-SIGA 608 is utilized (e.g., the third format (FIG. 7) and the seventh format (FIG. 9)), according to an embodiment.

FIG. 12B is a diagram of a portion of an example data unit 1250 that the AP 14 is configured to generate and transmit to the client station 25-1, according to some embodiments. In some embodiments, the client station 25-1 is also configured to generate and transmit the data unit 1250 to the AP 14. In an embodiment, the data unit 1250 conforms to the first communication protocol and occupies a 20 MHz bandwidth. In other embodiments, the data unit 1250 occupies another suitable bandwidth, such as 5 MHz, 10 MHz, 40 MHz, etc. The OFDM data unit 1250 includes 52 total subcarriers, comprising 48 data subcarriers and 4 pilot subcarriers, and the pilot subcarriers are located on subcarrier indices ±7, ±21. In an embodiment, the subcarriers are spaced 312.5 kHz apart. The pilot subcarriers modulate pilot sequences. In some embodiments, different suitable numbers of one or both of i) total subcarriers, and/or ii) pilot subcarriers, are utilized. In some embodiments, pilot subcarriers are located at suitable subcarrier indices other than ±7, ±21, and/or a suitable subcarrier spacing other than 312.5 kHz is utilized.

In the illustrative embodiment of FIG. 12B, some pilots (sometimes referred to herein as "new pilots") are different as compared to the pilot tone sequence illustrated in FIG. 12A. Thus, in an embodiment, a receiver is configured to recognize the pilot tone sequence illustrated in FIG. 12B as compared to the pilot tone sequence illustrated in FIG. 12A, and based on the recognition, determine a format of the data unit.

While the embodiment of FIG. 12B illustrates different pilots (as compared to the pilots illustrated in FIG. 12A) on the HE-SIGA1 608-1 OFDM symbol, in other embodiments, different pilots are on a different suitable number of OFDM symbols (e.g., two, three, four, five, etc.). While the embodiment of FIG. 12B illustrates different pilots (as compared to the pilots illustrated in FIG. 12A) on the HE-SIGA1 608-1 OFDM symbol, in other embodiments, different pilots are on a different OFDM symbols, such as a last OFDM symbol in the HE-SIGA field.

In some embodiments, the new pilots of data unit 1250 have a flipped polarity as compared to the corresponding pilots in the data unit 1200.

In some embodiments, an n-th symbol of an OFDM data unit starting from L-SIG is expressed as:

$$r_n(t) = \frac{1}{\sqrt{N_{field}^{tone}}} \sum_{k=-N_{SD}}^{N_{SD}} (x_{n,k} + p_n c_{n,k} P_k) \exp(j2\pi k \Delta_F (t - T_{GI})) \quad \text{Equation 2}$$

where $c_{n,k}$ is an n-th value of a sequence at the k-th subcarrier tone. Parameter $p_n c_{n,k} P_k$ sets a pilot value of the pilot sequence at the n-th symbol and the k-th subcarrier tone, and the sequence $c_{n,k}$ is selected from a plurality of sequences on a data unit format of the data unit to be transmitted.

In one such embodiment according to Equation 2, the sequence varies for different OFDM symbols, but is identical for all pilot subcarrier tones in each OFDM symbol. In the embodiment where a total of 52 subcarriers are present, pilot subcarrier tones at subcarrier indices ±7, ±21 modulate a pilot sequence which is set by the selected sequence $c_{n,k}$. In some embodiments, some values of the sequence $c_{n,k}$ correspond to a value of a pilot flipped in polarity as compared to other sequences $c_{n,k}$ and/or as compared to legacy pilots. In one illustrative embodiment, an n-th value of the sequence at a k-th subcarrier tone is defined by an equation:

$$c_{n,k} = \begin{cases} 1 & n \in \{1\} \cup \Omega_1 \\ -1 & n \in \Omega_2 \end{cases}, \text{ for } k = \pm 7, \pm 21 \quad \text{Equation 3}$$

where the OFDM symbol corresponding to n=1 corresponds to L-SIG 606 (FIG. 6), $\Omega_1$ is a first set of OFDM symbols in the data unit, and $\Omega_2$ is a second set of one or more OFDM symbols in the data unit. In another embodiment, $c_{n,k}$ includes one or more elements that is/are complex valued. In another embodiment, $c_{n,k}$ is different for each symbol in $\Omega_2$.

In other embodiments, one or more techniques described in U.S. patent application Ser. No. 15/143,075, entitled "WiFi Classification by Pilot Sequences," filed on Apr. 29, 2016, are utilized. U.S. patent application Ser. No. 15/143,075 is hereby incorporated by reference.

Distinguishing Among Formats by Detecting Properties of Formats

In some embodiments, a receiver device is configured to determine whether a PHY data unit conforms to a particular format based on analyzing a PHY preamble of the data unit to determine whether properties of the format are detected. For example, in an embodiment, a receiver device is configured to determine whether a PHY data unit conforms to a format in which repetition regarding HE-SIGA 608 is utilized (e.g., the third format (FIG. 7) and the seventh format (FIG. 9)), according to an embodiment. Referring again to FIGS. 7 and 9, in an embodiment, for instance, a receiver device is configured to analyze an OFDM symbol immediately following HE-SIGA1 608-1 to determine whether the OFDM symbol immediately following HE-SIGA1 608-1 corresponds to a repeated HE-SIGA1 608-1 with diversity.

Distinguishing Among Formats with Explicit Signaling in HE-SIGA

In some embodiments, a set of one or more bits in HE-SIGA 608 is defined for indicating a format of the PHY data unit. For example, in some embodiments, the set of one or more bits in HE-SIGA 608 is defined for indicating whether repetition regarding HE-SIGA 608 is utilized. As another example, in some embodiments, the set of one or more bits in HE-SIGA 608 is defined for indicating whether the PHY data unit includes HE-SIGB 614. In embodiments in which the set of one or more bits in HE-SIGA 608 is defined for indicating the format of the PHY data unit, transmitters that conform to the first communication protocol are configured to set a value of the set of one or more bits in HE-SIGA 608 to indicate the format. In embodiments in which the set of one or more bits in HE-SIGA 608 is defined for indicating the format of the PHY data unit, receivers that conform to the first communication protocol are configured to analyze the set of one or more bits in HE-SIGA 608 to determine the format based on analyzing the set of one or more bits. In some embodiments in which the set of one or more bits in HE-SIGA 608 is defined for indicating the format of the PHY data unit, receivers are configured to perform early trace-back in Viterbi decoding as part of decoding the set of one or more bits.

Distinguishing Among Formats with Additional Tones in Legacy Fields

Referring again to FIGS. 6-9, in some embodiments, one or more legacy fields in the PHY preamble conform to a legacy protocol, which defines the one or more legacy fields to comprise one or more OFDM symbols having a particular number of OFDM tones. In some embodiments, the first communication protocol defines a modification of the one or more legacy fields to include additional OFDM tones beyond those required by the legacy protocol, and the additional OFDM tones are utilized to distinguish among formats.

For example, in an embodiment, the legacy protocol defines L-SIG 606 to have 52 tones, which include four pilot tones. In an embodiment, the first communication protocol defines two additional OFDM tones to be used in L-SIG 606, e.g., one additional tone added after each outermost tone defined by the legacy protocol. In another embodiment, the first communication protocol defines four additional OFDM tones to be used in L-SIG 606, e.g., two additional tones added after each outermost tone defined by the legacy protocol. In other embodiments, the first communication protocol defines other suitable numbers of additional OFDM tones to be used in L-SIG 606, e.g., six, eight, ten, etc.

In an embodiment, the first communication protocol defines RL-SIG 607 to have the same number of OFDM tones as L-SIG 606. In an embodiment, the first communication protocol defines the additional tones in L-SIG 606 and RL-SIG 607 to be the same value(s), but the additional tones in RL-SIG 607 are phase shifted with respect to the additional tones in L-SIG 606 to indicate a format of the data unit. For example, in an illustrative embodiment, the additional tones in RL-SIG 607 are flipped in polarity with respect to the additional tones in L-SIG 606 to indicate that repetition is used with regard to HE-SIGA.

Distinguishing Among Formats with Reserved Bits in Legacy Fields

Referring again to FIGS. 6-9, in some embodiments, one or more legacy fields in the PHY preamble conform to a legacy protocol, and the legacy protocol defines one or bits in the one or more legacy fields as reserved. In some embodiments, the first communication protocol defines a modification of the one or more legacy fields such that one or more of the reserved bit(s) are utilized to distinguish among formats.

For example, in an embodiment, the legacy protocol defines L-SIG 606 to have a reserved bit. In an embodiment, the first communication protocol defines values of the reserved bit to indicate a format of the data unit. For example, in an illustrative embodiment, the reserved bit is set to zero to indicate that repetition with regard to HE-SIGA is not used, whereas the reserved bit is set to one to indicate that repetition with regard to HE-SIGA is used. As another example, in an illustrative embodiment, the reserved bit is set to zero to indicate that repetition with regard to HE-SIGA is used, whereas the reserved bit is set to one to indicate that repetition with regard to HE-SIGA is not used. As yet another example, in an illustrative embodiment, the reserved bit is set to zero to indicate that the PHY preamble includes HE-SIGB 614, whereas the reserved bit is set to one to indicate that the PHY preamble does not include HE-SIGB 614. As still another example, in an illustrative embodiment, the reserved bit is set to zero to indicate that the PHY preamble does not include HE-SIGB 614, whereas the reserved bit is set to one to indicate that the PHY preamble includes HE-SIGB 614.

Figure 13:
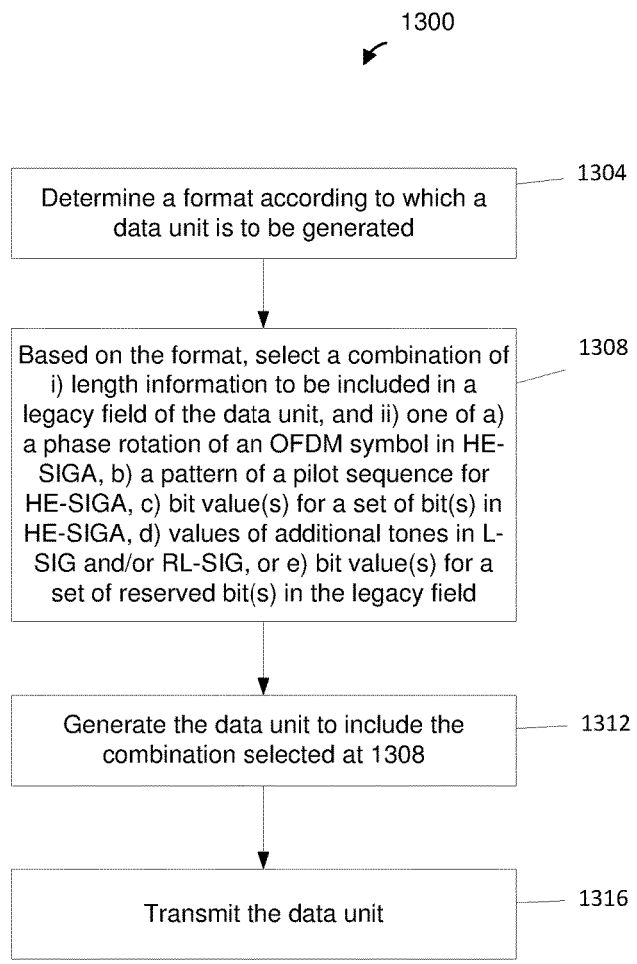
FIG. 13 is flow diagram of an example method for generating and transmitting a data unit with a PHY preamble that indicates a format of the PHY preamble, according to an embodiment.

FIG. 13 is a flow diagram of an example method 1300 for generating and transmitting a PHY data unit of a particular PHY format, according to an embodiment. In an embodiment, the method 1300 is implemented by a communication device in a WLAN, according to an embodiment. With reference to FIG. 1, the method 1300 is implemented by the network interface 27, in an embodiment. For example, in one such embodiment, the PHY processor 29 is configured to implement at least a portion of the method 1300. According to another embodiment, the MAC processing 28 is also configured to implement at least a part of the method 1300. With continued reference to FIG. 1, in yet another embodiment, the method 1300 is implemented by the network interface 16 (e.g., the PHY processor 20 and/or the MAC processor 18). In other embodiments, the method 1300 is implemented by other suitable network interfaces.

At block 1304, a communication device determines a PHY format according to which a PHY data unit (e.g., a PHY protocol data unit (PPDU)) is to be generated. In some embodiments, the format is one of a plurality of PHY data unit formats defined by a first communication protocol. In one embodiment, the plurality of PHY data unit formats include at least one format in which an HE-SIGB 614 is included in a PHY preamble, and a plurality of formats in which the PHY preamble does not include the HE-SIGB 614. In an embodiment, the plurality of PHY data unit formats include at least one format in which repetition regarding HE-SIGA is utilized, and a plurality of formats in which repetition regarding HE-SIGA is not utilized.

At block 1308, the communication device, based on the determined format to be used for generating the data unit, selects a combination of i) length information to be included in a legacy field of the PHY preamble (e.g., in L-SIG 606), and ii) one or more of a) a phase rotation of one or more OFDM symbols in a signal field in the PHY preamble (e.g., an OFDM symbol corresponding to HE-SIGA1 608-1, an OFDM symbol corresponding to HE-SIGA2 608-2, an OFDM symbol corresponding to RHE-SIGA1 712, etc.), b) a pattern of a pilot sequence to be used for generating one or more OFDM symbols of the PHY preamble, c) bit value(s) for a set of bit(s) in HE-SIGA 608, d) values of additional tones in L-SIG 606 and/or RL-SIG 607, or e) bit value(s) for a set of reserved bit(s) in the legacy field (e.g., in L-SIG 606).

At block 1312, the communication device generates the PHY data unit to include the combination selected at block 1308.

At block 1316, the communication device transmits the data unit generated at block 1312.

Figure 14:
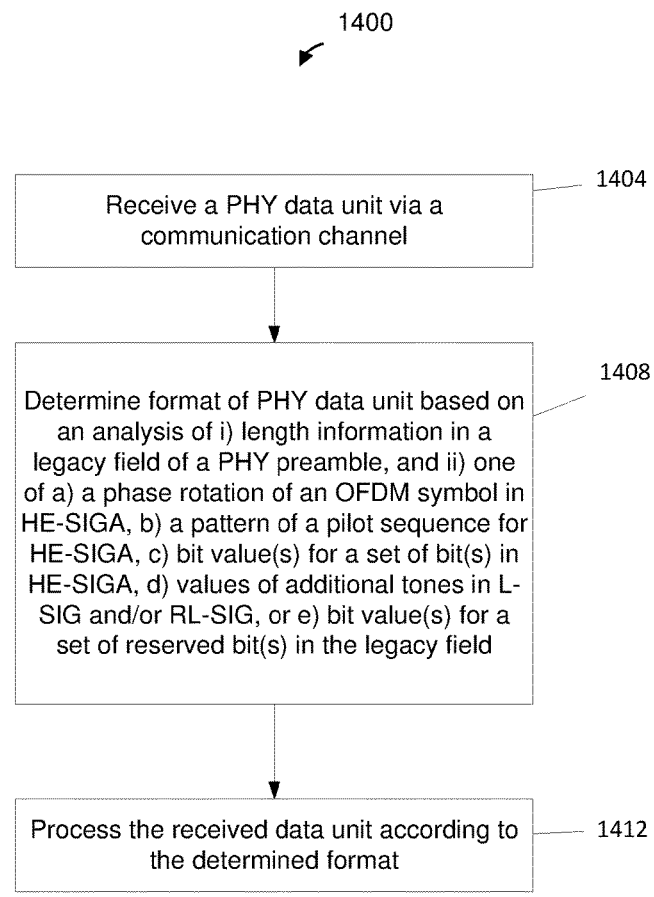
FIG. 14 is flow diagram of an example method for processing a data unit having a PHY preamble that indicates a format of the PHY preamble, according to an embodiment.

FIG. 14 is a flow diagram illustrating an example method 1400 for processing a received PHY data unit (e.g., a PPDU), according to an embodiment. In an embodiment, the method 1400 is implemented by a communication device in a WLAN, according to an embodiment. With reference to FIG. 1, the method 1400 is implemented by the network interface 27, in an embodiment. For example, in one such embodiment, the PHY processor 29 is configured to implement at least a portion of the method 1400. According to another embodiment, the MAC processing 28 is also configured to implement at least a part of the method 1400. With continued reference to FIG. 1, in yet another embodiment, the method 1400 is implemented by the network interface 16 (e.g., the PHY processor 20 and/or the MAC processor 18). In other embodiments, the method 1400 is implemented by other suitable network interfaces.

At block 1404, a communication device receives a PHY data unit via a communication channel, where the PHY data unit conforms to the first communication protocol.

At block 1408, the communication device determines a format of the PHY data unit based on an analysis of i) length information in a legacy field of a PHY preamble of the PHY data unit (e.g., in L-SIG 606), and ii) one or more of a) a phase rotation of one or more OFDM symbols in a signal field in the PHY preamble (e.g., an OFDM symbol corresponding to HE-SIGA1 608-1, an OFDM symbol corresponding to HE-SIGA2 608-2, an OFDM symbol corresponding to RHE-SIGA1 712, etc.), b) a pattern of a pilot sequence of one or more OFDM symbols of the PHY preamble, c) bit value(s) for a set of bit(s) in HE-SIGA 608, d) values of additional tones in L-SIG 606 and/or RL-SIG 607, or e) bit value(s) for a set of reserved bit(s) in the legacy field (e.g., in L-SIG 606).

At block 1412, the communication device, processes the received PHY data unit according to the format determined at block 1408. For example, in some embodiments, the different formats correspond to different PHY preamble formats in which i) HE-SIGB 614 is included, ii) HE-SIGB 614 is not included, iii) repetition regarding HE-SIGA is utilized, iv) repetition regarding HE-SIGA is not utilized, etc. Thus, in some embodiments, block 1412 includes processing the PHY preamble of the received data unit according to one or more of i) one or more fields specified by the determined format (e.g., at least some of the other formats do not include the one or more fields), ii) repetition of information specified by the determined format (e.g., at least some of the other formats do not include the repetition), etc.

Figure 15:
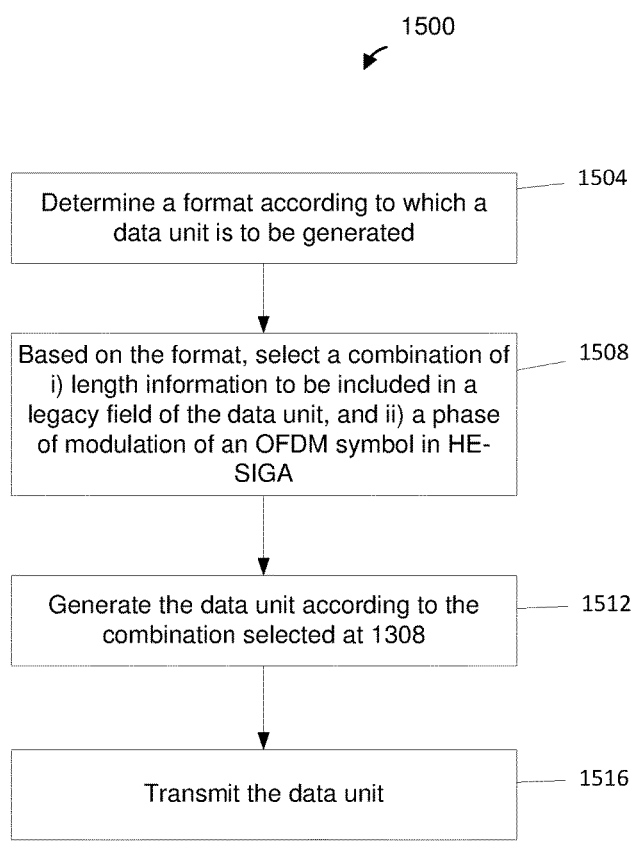
FIG. 15 is flow diagram of another example method for generating and transmitting a data unit with a PHY preamble that indicates a format of the PHY preamble, according to an embodiment.

FIG. 15 is a flow diagram of an example method 1500 for generating and transmitting a PHY data unit of a particular PHY format, according to an embodiment. In an embodiment, the method 1500 is implemented by a communication device in a WLAN, according to an embodiment. With reference to FIG. 1, the method 1500 is implemented by the network interface 27, in an embodiment. For example, in one such embodiment, the PHY processor 29 is configured to implement at least a portion of the method 1500. According to another embodiment, the MAC processing 28 is also configured to implement at least a part of the method 1500. With continued reference to FIG. 1, in yet another embodiment, the method 1500 is implemented by the network interface 16 (e.g., the PHY processor 20 and/or the MAC processor 18). In other embodiments, the method 1500 is implemented by other suitable network interfaces.

At block 1504, a communication device determines a PHY format according to which a PHY data unit (e.g., a PHY protocol data unit (PPDU)) is to be generated. In some embodiments, the format is one of a plurality of PHY data unit formats defined by a first communication protocol. In one embodiment, the plurality of PHY data unit formats include at least one format in which an HE-SIGB 614 is included in a PHY preamble, and a plurality of formats in which the PHY preamble does not include the HE-SIGB 614. In an embodiment, the plurality of PHY data unit formats include at least one format in which repetition regarding HE-SIGA is utilized, and a plurality of formats in which repetition regarding HE-SIGA is not utilized.

In an embodiment, the plurality of PHY data unit formats includes a first subset of formats and a second subset of one or more formats. In an embodiment, the first subset includes i) a first format corresponding to a multi-user transmission format that includes HE-SIGB 614 and does not utilize repetition regarding HE-SIGA, and ii) a second format corresponding to an extended range single-user transmission format that does not include HE-SIGB 164 and utilizes repetition regarding HE-SIGA. In an embodiment, the set subset includes one or more third formats that do not include HE-SIGB 614.

At block 1508, the communication device, based on the determined format to be used for generating the data unit, selects a combination of i) length information to be included in a legacy field of the PHY preamble (e.g., in L-SIG 606), and ii) a phase rotation of one or more OFDM symbols in a signal field in the PHY preamble (e.g., an OFDM symbol corresponding to HE-SIGA1 608-1, an OFDM symbol corresponding to HE-SIGA2 608-2, an OFDM symbol corresponding to RHE-SIGA1 712, etc. In one embodiment, a length value is selected to be a value that is not divisible by three, and so that a remainder after dividing the length value by three has a first value when the format belongs to the first subset of formats and has a second value when the format belongs to the second subset of one or more formats. In an embodiment, when the selected format includes repetition regarding HE-SIGA, the phase of modulation of RHE-SIGA1 712 is selected to have a phase shift of 90 degrees as compared to HE-SIGA1 608-1.

At block 1412, the communication device generates the PHY data unit according to the combination selected at block 1408.

At block 1416, the communication device transmits the data unit generated at block 1412.

Figure 16:
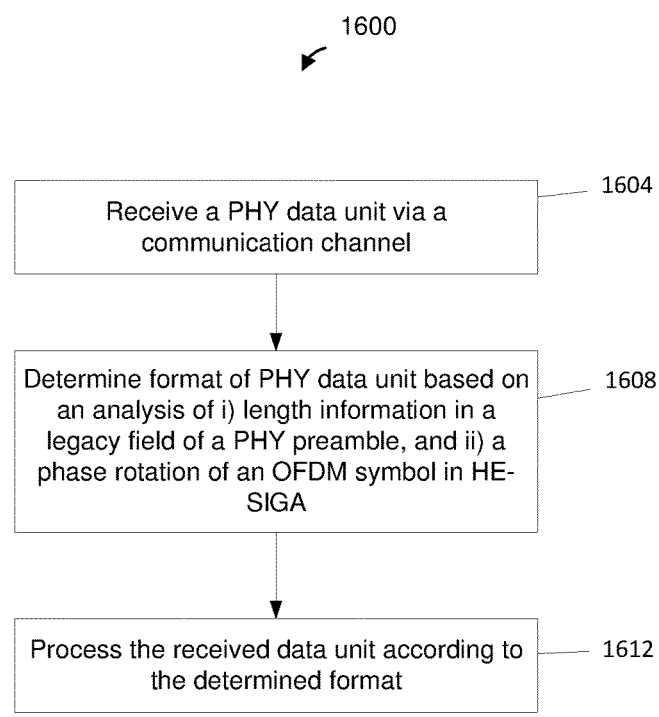
FIG. 16 is flow diagram of another example method for processing a data unit having a PHY preamble that indicates a format of the PHY preamble, according to an embodiment.

FIG. 16 is a flow diagram illustrating an example method 1600 for processing a received PHY data unit (e.g., a PPDU), according to an embodiment. In an embodiment, the method 1600 is implemented by a communication device in a WLAN, according to an embodiment. With reference to FIG. 1, the method 1600 is implemented by the network interface 27, in an embodiment. For example, in one such embodiment, the PHY processor 29 is configured to implement at least a portion of the method 1600. According to another embodiment, the MAC processing 28 is also configured to implement at least a part of the method 1600. With continued reference to FIG. 1, in yet another embodiment, the method 1600 is implemented by the network interface 16 (e.g., the PHY processor 20 and/or the MAC processor 18).

In other embodiments, the method 1600 is implemented by other suitable network interfaces.

At block 1604, a communication device receives a PHY data unit (e.g., PPDU) via a communication channel, where the PHY data unit conforms to the first communication protocol.

At block 1608, the communication device determines a format of the PHY data unit based on an analysis of i) length information in a legacy field of a PHY preamble of the PHY data unit (e.g., in L-SIG 606), and ii) a phase rotation of one or more OFDM symbols in a signal field in the PHY preamble (e.g., an OFDM symbol corresponding to HE-SIGA1 608-1, an OFDM symbol corresponding to HE-SIGA2 608-2, an OFDM symbol corresponding to RHE-SIGA1 712, etc.

In an embodiment, a set of PHY data unit formats defined by the first communication protocol includes a first subset of formats and a second subset of one or more formats. In an embodiment, the first subset includes i) a first format corresponding to a multi-user transmission format that includes HE-SIGB 614 and does not utilize repetition regarding HE-SIGA, and ii) a second format corresponding to an extended range single-user transmission format that does not include HE-SIGB 164 and utilizes repetition regarding HE-SIGA. In an embodiment, the set subset includes one or more third formats that do not include HE-SIGB 614.

In one embodiment, block 1608 includes dividing a length value included in L-SIG 606 by three, and determining a remainder after dividing the length value by three. Block 1608 includes, if the remainder has a first value, it is determined that the format of the PHY data unit belongs to the first subset of formats, and if the remainder has a second value it is determined that the format belongs to the second subset of one or more formats.

In an embodiment, block 1608 includes determining a phase of modulation of a second OFDM symbol corresponding to the HE-SIGA field. When it determined that modulation of the second OFDM symbol corresponding to the HE-SIGA field is not phase shifted as compared to modulation of the first OFDM symbol corresponding to HE-SIGA, it is determined that the data unit does not utilize repetition regarding the HE-SIGA field. On the other hand, when it determined that modulation of the second OFDM symbol corresponding to the HE-SIGA field is phase shifted by 90 degrees as compared to modulation of the first OFDM symbol corresponding to HE-SIGA, it is determined that the data unit utilizes repetition regarding the HE-SIGA field At block 1612, the communication device, processes the received PHY data unit according to the format determined at block 1608. For example, in some embodiments, the different formats correspond to different PHY preamble formats in which i) HE-SIGB 614 is included, ii) HE-SIGB 614 is not included, iii) repetition regarding HE-SIGA is utilized, iv) repetition regarding HE-SIGA is not utilized, etc. Thus, in some embodiments, block 1612 includes processing the PHY preamble of the received data unit according to whether i) HE-SIGB 614 is included in the PHY preamble, and ii) whether repetition of information in HE-SIGA is include in the PHY preamble.

In an embodiment, a method includes: determining, at a communication device, a format according to which a physical layer (PHY) data unit is to be generated; selecting, at the communication device, i) length information to be included in a field in a legacy portion of a PHY preamble of the PHY data unit, and ii) a phase of modulation of an orthogonal frequency division modulation (OFDM) symbol in a non-legacy portion of the PHY preamble, wherein the length information and the phase of modulation are selected to indicate the format from a set of multiple PHY formats defined by a communication protocol; generating, at the communication device, the PHY data unit to include the selected length information in the field in the legacy portion of the PHY preamble and to modulate the OFDM symbol in the non-legacy portion of the PHY preamble with the selected phase; and transmitting, by the communication device, the PHY data unit.

In various other embodiments, the method includes one of, or any suitable combination of two or more of, the following features.

Selecting the length information includes selecting a length value to be included in the field in the legacy portion of the PHY preamble so that: the length value is not divisible by three; a first value of a remainder resulting from dividing the length value by three indicates the format of the PHY preamble belongs to a first subset of formats; and a second value of the remainder resulting from dividing the length value by three indicates the format of the PHY preamble belongs to a second subset of one or more formats.

When the format belongs to the first subset, the phase of modulation of the OFDM symbol in the non-legacy portion of the PHY preamble indicates to which format in the first subset the PHY data unit conforms.

Selecting the phase of modulation comprises selecting the phase of modulation of a second occurring OFDM symbol in a signal field defined by the communication protocol.

The phase of modulation of the second occurring OFDM symbol in the signal field defined by the communication protocol indicates whether the PHY preamble includes an additional signal field.

In another embodiment, an apparatus comprises a network interface device having one or more integrated circuits (ICs). The one or more ICs are configured to: determine a format according to which a PHY data unit is to be generated; and select i) length information to be included in a field in a legacy portion of a PHY preamble of the PHY data unit, and ii) a phase of modulation of an OFDM symbol in a non-legacy portion of the PHY preamble, wherein the length information and the phase of modulation are selected to indicate the format from a set of multiple PHY formats defined by a communication protocol. The one or more ICs are further configured to: generate the data unit to include the selected length information in the field in the legacy portion of the PHY preamble and to modulate the OFDM symbol in the non-legacy portion of the PHY preamble with the selected phase, and transmit the data unit.

In various other embodiments, the apparatus includes one of, or any suitable combination of two or more of, the following features.

The one or more ICs are configured to select a length value to be included in the field in the legacy portion of the PHY preamble so that: the length value is not divisible by three; a first value of a remainder resulting from dividing the length value by three indicates the format of the PHY preamble belongs to a first subset of formats; and a second value of the remainder resulting from dividing the length value by three indicates the format of the PHY preamble belongs to a second subset of one or more formats.

The one or more ICs are configured to, when the format belongs to the first subset, select the phase of modulation of the OFDM symbol in the non-legacy portion of the PHY preamble to indicate to which format in the first subset the PHY data unit conforms.

The one or more ICs are configured to select the phase of modulation of a second occurring OFDM symbol in a signal field defined by the communication protocol.

The one or more ICs are configured to select the phase of modulation of the second occurring OFDM symbol in the signal field to indicate whether the PHY preamble includes an additional signal field.

In yet another embodiment, a method includes: receiving, at a communication device, a PHY data unit via a communication channel; analyzing, at the communication device, i) length information in a field in a legacy portion of a PHY preamble of the PHY data unit, and ii) a phase of modulation of an OFDM symbol in a non-legacy portion of the PHY preamble; determining, at the communication device, a format of the received PHY data unit corresponding to the analysis of i) the length information and ii) the phase of modulation of the OFDM symbol in the non-legacy portion of the PHY preamble; and processing, at the communication device, the received PHY data unit according to the determined format.

In various other embodiments, the method includes one of, or any suitable combination of two or more of, the following features.

Analyzing the length information includes: determining, at the communication device, a remainder resulting from dividing a length value in the field in the legacy portion of the PHY preamble; and determining the format includes: when the remainder equals a first value, determining that the format of the PHY preamble belongs to a first subset of formats, and when the remainder equals a second value, a determining that the format of the PHY preamble belongs to a second subset of one or more formats.

Determining the format includes: when it is determined that the format belongs to the first subset, selecting to which format in the first subset the PHY data unit conforms based on the phase of modulation of the OFDM symbol in the non-legacy portion of the PHY preamble.

Analyzing the phase of modulation comprises analyzing the phase of modulation of a second occurring OFDM symbol in a signal field defined by the communication protocol.

Determining the format includes: determining whether the PHY preamble includes an additional signal field based on the phase of modulation of the second occurring OFDM symbol in the signal field.

In still another embodiment, an apparatus comprises a network interface device having one or more ICs. The one or more ICs are configured to: receive a PHY data unit via a communication channel; analyze i) length information in a field in a legacy portion of a PHY preamble of the PHY data unit, and ii) a phase of modulation of an OFDM symbol in a non-legacy portion of the PHY preamble; determine a format of the received PHY data unit corresponding to the analysis of i) the length information and ii) the phase of modulation of the OFDM symbol in the non-legacy portion of the PHY preamble; and process the received PHY data unit according to the determined format.

In various other embodiments, the apparatus includes one of, or any suitable combination of two or more of, the following features.

The one or more ICs are configured to: determining, at the communication device, a remainder resulting from dividing a length value in the field in the legacy portion of the PHY preamble; when the remainder equals a first value, determine that the format of the PHY preamble belongs to a first subset of formats; and when the remainder equals a second value, determine that the format of the PHY preamble belongs to a second subset of one or more formats.

The one or more ICs are configured to: when it is determined that the format belongs to the first subset, select to which format in the first subset the PHY data unit conforms based on the phase of modulation of the OFDM symbol in the non-legacy portion of the PHY preamble.

The one or more ICs are configured to: analyze the phase of modulation of a second occurring OFDM symbol in a signal field defined by the communication protocol.

The one or more ICs are configured to: determine whether the PHY preamble includes an additional signal field based on the phase of modulation of the second occurring OFDM symbol in the signal field.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining, at a communication device, a format according to which a physical layer (PHY) data unit is to be generated, wherein the determined format is selected from a set of multiple PHY formats defined by a communication protocol;
   selecting, at the communication device: i) a length value to be included in a field in a legacy portion of a PHY preamble of the PHY data unit, and ii) a phase of modulation of an orthogonal frequency division modulation (OFDM) symbol in a non-legacy portion of the PHY preamble, wherein:
      the length value and the phase of modulation are selected to correspond to the determined format,
      the length value is not divisible by three,
      a first value of a remainder resulting from dividing the length value by three corresponds to a first subset of formats among the multiple PHY formats,
      the first subset of formats includes a multi-user format,
      a second value of the remainder resulting from dividing the length value by three corresponds to a second subset of one or more formats among the multiple PHY formats, and
      when the determined format belongs to the first subset, the phase of modulation of the OFDM symbol in the non-legacy portion of the PHY preamble indicates whether the PHY data unit conforms to the multi-user format;

generating, at the communication device, the PHY data unit to include the selected length value in the field in the legacy portion of the PHY preamble and to modulate the OFDM symbol in the non-legacy portion of the PHY preamble with the selected phase; and transmitting, by the communication device, the PHY data unit.

2. The method of claim 1, wherein:

the PHY preamble includes a signal field in the non-legacy portion of the PHY preamble;

the second subset of one or more formats includes a format in which the PHY preamble includes repeated bits of the signal field; and the second value of the remainder resulting from dividing the length value by three indicates that the PHY data unit conforms to the format in which the PHY preamble includes repeated bits of the signal field.

3. The method of claim 2, wherein:

the OFDM symbol in the non-legacy portion of the PHY preamble is a first OFDM symbol in the signal field;

the signal field includes a second OFDM symbol;

the first OFDM symbol follows the second OFDM symbol in the non-legacy portion of the PHY preamble; and selecting the phase of modulation comprises selecting the phase of modulation of the first OFDM symbol.

4. An apparatus, comprising:

a network interface device having one or more integrated circuit (IC) devices configured to:

determine a format according to which a physical layer (PHY) data unit is to be generated, wherein the determined format is selected from a set of multiple PHY formats defined by a communication protocol, select i) a length value to be included in a field in a legacy portion of a PHY preamble of the PHY data unit, and ii) a phase of modulation of an orthogonal frequency division modulation (OFDM) symbol in a non-legacy portion of the PHY preamble, wherein:

the length value and the phase of modulation are selected to correspond to the determined format, the length value is not divisible by three, a first value of a remainder resulting from dividing the length value by three corresponds to a first subset of formats among the multiple PHY formats, the first subset of formats includes a multi-user format, a second value of the remainder resulting from dividing the length value by three corresponds to a second subset of one or more formats among the multiple PHY formats, the second subset of formats includes a multi-user format, and when the determined format belongs to the first subset, the phase of modulation of the OFDM symbol in the non-legacy portion of the PHY preamble indicates whether the PHY data unit conforms to the multi-user format;

wherein the one or more IC devices are further configured to:

generate the PHY data unit to include the selected length value in the field in the legacy portion of the PHY preamble and to modulate the OFDM symbol in the non-legacy portion of the PHY preamble with the selected phase, and transmit the data unit.

5. The apparatus of claim 4, wherein:

the one or more IC devices are further configured to generate the PHY preamble to include a signal field in the non-legacy portion of the PHY preamble;

the second subset of one or more formats includes a format in which the PHY preamble includes repeated bits of the signal field; and the second value of the remainder resulting from dividing the length value by three indicates that the PHY data unit conforms to the format in which the PHY preamble includes repeated bits of the signal field.

6. The apparatus of claim 5, wherein:

the OFDM symbol in the non-legacy portion of the PHY preamble is a first OFDM symbol in the signal field;

the one or more IC devices are further configured to generate the signal field to include a second OFDM symbol;

the first OFDM symbol follows the second OFDM symbol in the non-legacy portion of the PHY preamble; and the one or more IC devices are further configured to select the phase of modulation of the first OFDM symbol.

7. The apparatus of claim 4, wherein the network interface device includes:

a media access control (MAC) processor implemented on the one or more IC devices; and a physical layer (PHY) processor implemented on the one or more IC devices, the PHY processor being coupled to the MAC processor.

8. The apparatus of claim 7, wherein:

the PHY processor comprises a plurality of transceivers.

9. The apparatus of claim 8, further comprising:

a plurality of antennas coupled to the plurality of transceivers.

* * * * *